US 9,896,048 B2

(12) United States Patent
Boucly et al.

(10) Patent No.: US 9,896,048 B2
(45) Date of Patent: Feb. 20, 2018

(54) POWER SUPPLY UNIT FOR SUPPLYING POWER TO AN ON-BOARD ELECTRICAL NETWORK OF A VEHICLE

(71) Applicant: Technoboost, Paris (FR)

(72) Inventors: Bernard Boucly, Le Chesnay (FR); Eric Lecrux, La Boissière École (FR); Serge Da Cruz Pereira, Saint Ouen l'Aumone (FR); Eric Mizwicki, Menucourt (FR)

(73) Assignee: Technoboost, Paris (FR)

( * ) Notice: Subject to any disclaimer, the term of this patent is extended or adjusted under 35 U.S.C. 154(b) by 346 days.

(21) Appl. No.: 14/433,339

(22) PCT Filed: Sep. 27, 2013

(86) PCT No.: PCT/FR2013/052285
§ 371 (c)(1),
(2) Date: Apr. 2, 2015

(87) PCT Pub. No.: WO2014/053749
PCT Pub. Date: Apr. 10, 2014

(65) Prior Publication Data
US 2015/0274099 A1 Oct. 1, 2015

(30) Foreign Application Priority Data

Oct. 2, 2012 (FR) .................................. 12 59318
Oct. 5, 2012 (FR) .................................. 12 59468
(Continued)

(51) Int. Cl.
H02G 3/00 (2006.01)
B60R 16/033 (2006.01)
(Continued)

(52) U.S. Cl.
CPC ............. B60R 16/033 (2013.01); H02M 1/08 (2013.01); H02M 3/04 (2013.01); H02M 3/156 (2013.01); H02M 2003/1586 (2013.01)

(58) Field of Classification Search
None
See application file for complete search history.

(56) References Cited

U.S. PATENT DOCUMENTS 5,193,054 A * 3/1993 Galloway ................. H02J 4/00
307/82
5,793,191 A * 8/1998 Elmore ................... H02J 1/102
323/272
(Continued)

FOREIGN PATENT DOCUMENTS

FR 2970094 A1 7/2012

OTHER PUBLICATIONS

International Search Report of corresponding application PCT/FR2013/052285 dated Feb. 19, 2014.

Primary Examiner — Lincoln Donovan
Assistant Examiner — Khareem E Almo
(74) Attorney, Agent, or Firm — Polster Lieder Woodruff & Lucchesi, L.C.

(57) ABSTRACT

The invention relates to a power supply unit (3) for supplying power to an on-board electrical network of a vehicle, including: at least two DC-to-DC converters (9A, 9B) which are interleaved and reversible between an opera-ting mode for lowering voltage and an operating mode for raising voltage, the converters (9A, 9B) being intended for being connected to a power storage device (ST2) and being capable of supplying current to the on-board network; and a switch (K) enabling a power source (STI) to supply power to the on-board network when the switch (K) is in a first state, and enabling the power storage device (ST2) to supply power to the on-board network when the switch (K) is in a (Continued)

second state. The unit is characterized in that the converters (9A, 9B) are variable-frequency converters, and in that the power supply unit (3) also includes a synchronization unit (200) configured such as to synchronize the operation of the converters (9A, 9B) operating at variable frequencies and the current generation of the converters.

3 Claims, 39 Drawing Sheets

(30) Foreign Application Priority Data

| | | |
|---|---|---|
| Oct. 10, 2012 | (FR) | 12 59667 |
| Oct. 10, 2012 | (FR) | 12 59670 |
| Oct. 16, 2012 | (FR) | 12 59837 |

(51) Int. Cl.
*H02M 1/08* (2006.01)
*H02M 3/156* (2006.01)
*H02M 3/04* (2006.01)
*H02M 3/158* (2006.01)

(56) References Cited

U.S. PATENT DOCUMENTS

| | | | | |
|---|---|---|---|---|
| 5,905,369 | A * | 5/1999 | Ishii | H02M 3/1584 323/222 |
| 7,701,730 | B2 * | 4/2010 | Cohen | H02M 1/4216 363/9 |
| 7,706,151 | B2 * | 4/2010 | Neidorff | H02M 1/4216 363/9 |
| 7,933,132 | B2 * | 4/2011 | Bridge | H02M 3/1584 363/65 |
| 8,125,203 | B2 * | 2/2012 | Ayukawa | H02M 1/4225 323/222 |
| 8,279,645 | B2 * | 10/2012 | Bridge | H02M 3/1584 363/65 |
| 9,214,871 | B2 * | 12/2015 | Tsuchiya | H02M 7/49 |

\* cited by examiner panne = failure
synchro = start

SENS = DIRECTION
Rapport cyclique = Duty cycle haute = high

POWER SUPPLY UNIT FOR SUPPLYING POWER TO AN ON-BOARD ELECTRICAL NETWORK OF A VEHICLE

CROSS-REFERENCE TO RELATED APPLICATIONS

The present invention is the US national stage under 35 U.S.C. §371 of International Application No. PCT/FR2013/052285 which was filed on Sep. 27, 2013 and which claims priority to French patent application 1259837 filed Oct. 16, 2012, U.S. Pat. No. 1,259,667 filed Oct. 10, 2012, U.S. Pat. No. 1,259,458 filed Oct. 5, 2012, U.S. Pat. No. 1,259,318 filed Oct. 2, 2012 and U.S. Pat. No. 1,259,670 filed Oct. 10, 2012, the contents of which (texts, drawings and claims) are incorporated herein by reference.

BACKGROUND

The present invention relates in general manner to a power supply unit for supplying an on-board network of a vehicle.

Units for supplying an on-board network of a vehicle with electrical energy existing in the automotive industry include interlaced multi-phase converters working at a fixed frequency (e.g. 150 kHz for each phase). For example, the document FR2970094 describes a unit for supplying electrical energy in an on-board network including a plurality of interlaced converters also working at a fixed frequency.

However, for such a unit, the conducted and radiated emissions are present on a narrow spectrum in radio frequency and filters are thus necessary to meet EMI standards required for the components of a vehicle.

In addition, the converters operating at a fixed frequency do not maintain the stability of the control function for a duty cycle higher than 50% and this limits the output power of the converters and of the unit.

In addition, these interlaced fixed frequency converters, by principle, need to have a minimum duty cycle of minimal control (e.g. 1%) to keep the phase-lock loop stability of the output voltage. This principle involves consuming, at minimum, a load current of a few amperes, which implies poor performance.

In addition, variations in the input voltage of the unit are not taken into account by the regulator of the unit so that the unit operation may become unstable.

BRIEF SUMMARY

An objective of the present invention is to address the above mentioned issues and, in particular, to provide a power supply unit to supply the on-board network of a vehicle with electrical energy that can provide the required output power in a stable fashion and that does not require filters to eliminate the narrow emission of radio frequency in order to meet the required EMI standards.

In that respect, one aspect of this invention involves providing a power supply unit to supply an on-board network of a vehicle with electrical energy, comprising:

At least two current converters DC/DC interlaced and reversible between a step-down/step-up voltage mode, the converters being intended to be subsequently connected to an electrical energy storage device and able to provide a current to the on-board network;

A switch allowing the electric power source to supply the on-board network when the switch is in a first state, and allowing the electric energy storage device to supply the on-board network when the switch is in a second state, Characterized in that the converters are variable frequency converters and that the supplying unit further comprises a synchronizing device configured to synchronize the operation of the converters operating at variable frequencies and the current generation of the converters.

Such a device synchronizes the operation of a plurality of DC/DC converters working with variable frequency across the operating frequency range. The converters can operate with interlacing regardless of the working frequency of the converters (for example, within a range of 4 kHz to 40 kHz) and maintain the stability of the control function for a duty cycle higher than 50%. Additionally, conducted and radiated emissions are presented on a wide spectrum in radio frequency and filters are no longer required to meet the required EMI standards.

Advantageously, the synchronizing unit comprises:

Means for receiving a switching signal generated by each of the converters;

Means for detecting a type of transition of the received switching signals;

Means for generating a synchronization signal when a transition is detected; and Means for providing the synchronization signal to one of the converters, the means being configured to provide the synchronization signal to a different converter in sequence each time a transition is detected.

A particularly interesting application is that it further includes synchronization starter means able to provide a synchronization signal to a predetermined converter.

Advantageously, the synchronization starter means include means for receiving a value of a current flowing through the inductance of a converter among converters and means for generating a synchronization starter signal when the value of said current reaches a predetermined value.

Advantageously, the means for receiving include a differentiating circuit for processing the switching signal received from each of the converters.

Advantageously, the means to detect a transition of the switching signals include an OU circuit.

Advantageously, the means to generate a synchronization signal when a transition is detected include a D flip-flop (toggle)

Advantageously, it includes the electric energy storage device.

According to a second aspect, the present invention relates to a system comprising the unit as described above, an electrical energy source linked to the unit, and an on-board network connected to the unit, including a calculator and at least one power consuming device.

According to a third aspect, the present invention relates to a motor vehicle comprising a unit as defined above or a system as defined above.

BRIEF DESCRIPTION OF THE FIGURES

Other features and advantages of the present invention will become more apparent upon reading the following detailed description of an application of the invention provided as an example, but not limited thereto, and illustrated by the accompanying drawings, in which.

DESCRIPTION

Figure 1:
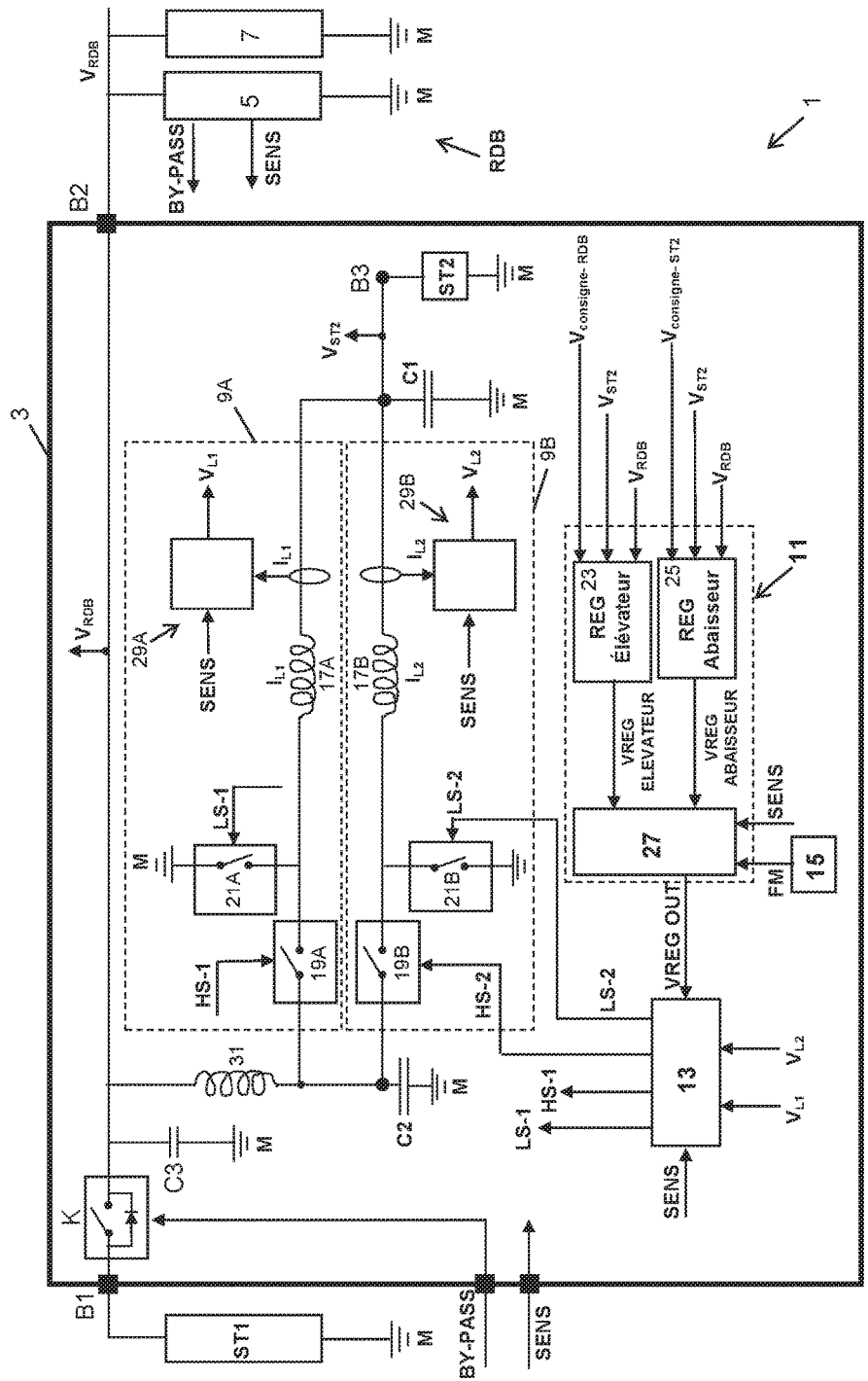
FIG. 1 illustrates a system according to the present invention including a power supply unit for supplying power to an on-board electrical network of a vehicle in accordance with the present invention, an electrical energy source and an on-board entertainment network (RDB) for a vehicle.

FIG. 1 illustrates a system 1 according to the present invention which includes a power supply unit 3 for supplying electrical energy to an on-board network according to the present invention, an electric ST1 power source, and the on-board entertainment network (RDB) of a vehicle. The unit 3 is connected to the source of electrical energy ST1 via a first terminal B1 and the RDB on-board network via a second terminal B2. The electric power source is, for example, a battery such as an electrochemical battery or a supercapacitor. The RDB comprises a calculator 5 and at least one power consumer device 7.

The unit 3 comprises an electrical energy storage device ST2 and a bypass switch K connected to the source of electrical energy ST1 via the first terminal B1 and connected to the RDB via the second terminal B2. The calculator 5 is further configured to lock the bypass switch K of unit 3 in order to supply the on-board network in electrical energy and charge the electric energy storage device ST2. The calculator 5 is configured to open the K bypass switch to supply the on-board RDB in electrical energy through the electrical energy storage device ST2.

A diode D1 is arranged in parallel with the bypass switch K. The anode of diode D1 is connected to the first terminal B1 and the cathode of diode D1 is connected to the second terminal B2.

The calculator 5 is configured to generate a BY-PASS signal and provide it to the K bypass switch to close or open the bypass switch K.

Calculator 5 is further configured to generate a binary signal SENS (DIRECTION) and to provide it to unit 3.

Unit 3 is capable of receiving the DIRECTION signal and configures the unit 3 in step-down voltage mode or step-up voltage mode according to the value of the DIRECTION signal. When the bypass switch K is closed, the calculator 5 provides a direction signal having a value (e.g., 0V) showing that a configuration in step-down voltage mode is to be implemented, and when the bypass switch K is opened, the calculator 5 provides a DIRECTION signal having a value (e.g. 5V) indicating that a configuration in step-up voltage mode is to be implemented.

Unit 3 further comprises two interlaced converters 9A, 9B. Each converter 9A, 9B is reversible between an operating step-down and step-up voltage operating mode, and works with variable frequency. Each converter is a converter operating at variable frequency and each converter is controlled in current and voltage. Both converters 9A, 9B are connected in parallel. They are running in synchronized variable frequency self-oscillation mode.

Unit 3 further comprises a controller 11, a generator 13 and a modulator 15. The controller 11 outputs a control voltage VREG OUT serving as reference voltage for the voltages $V_{L1}$ and $V_{L2}$ image of the $I_{L1}$ and $I_{L2}$ currents of the converters 9A, 9B. Control in current $I_{L1}$ and $I_{L2}$ is realized by the generator 13.

Unit 3 as illustrated in FIG. 1 includes the electrical energy storage device ST2. The electrical energy storage device ST2 is electrically connected on one side to the grounding device M and on the other side to a third terminal B3. Alternatively, unit 3 does not include the electrical energy storage device ST2 but it is then connected to an external electrical energy storage device through a terminal (not shown) of the unit 3.

Converter 9A comprises an inductance 17A, a first switch 19A, and a second switch 21A, where switches 19A and 21A form a half bridge. Converter 9B comprises an inductance 17B, a first switch 19B, and a second switch 21B, where switches 19B and 21B form a half bridge. The first switch 19A and the second switch 21A are adapted to respectively receive an HS-1 and LS-1 driving signal from generator 13 for controlling the switches 19A and 21A to generate a current through the inductance 17A. First switch 19B and second switch 21B are respectively capable of receiving a control signal HS-2 and LS-2 from generator 13 in order to drive switches 19B and 21B in order to generate a current through the inductance 17B.

Each switch 19A or 19B is electrically connected on one side to the first terminal B1 through the switch K and on the other side in series with the inductance 17A or 17B which is connected to the other side to the third terminal B3 and the electric energy storage device ST2. Each switch 21A or 21B is electrically connected at one end between the switch 19A, 19B and the inductance 17A, 17B and on the other side to the grounding device M.

Generator 13 is adapted to receive the DIRECTION signal and adopt the configuration of a step-down mode converter when the value of the DIRECTION signal is equal to 0V (a 0 logic level). In this case, the K bypass switch is closed and the third terminal B3 is a voltage output terminal of the converter and the first terminal B1 is a voltage input terminal of the converter.

Generator 13 is further adapted to adopt the configuration of a step-up mode converter when the value of the DIRECTION signal is equal to 5V (a 1 logic level). In this case, the K bypass switch is open and the third terminal B3 is a voltage input terminal of the converter and the second terminal B2 is a voltage output terminal of the converter.

Controller 11 provides a regulated voltage VREG OUT of the current through the inductances 17A, 17B to generator 13. Controller 11 includes a first controller 23 for the step-down mode operation and a second controller 25 for the step-up mode operation. Controller 11 further comprises a selection device 27 adapted to select a control voltage VREG ELEVATEUR (STEP-UP) supplied by the first controller 23 or a control voltage VREG ABAISSEUR (STEP-DOWN) supplied by the second controller 25 according to the value of the DIRECTION signal. The selection device 27 is adapted to provide VREG STEP-DOWN voltage control or VREG STEP-UP voltage control (voltage control VREG OUT) to the generator 13.

Modulator 15 is configured to provide an AC voltage signal at a predetermined frequency to controller 11.

Each converter 9A or 9B includes means 29A, 29B respectively to provide a voltage $V_{L1}$ and $V_{L2}$ (an image of the current $I_{L1}$ and $I_{L2}$) representative of the current $I_{L1}$ and $I_{L2}$ respectively flowing through the inductance 17A and 17B to the generator 13. Means 29A and 29B comprise a linear current/voltage converter of R increase to convert a sampling of $I_{L1}$ or $I_{L2}$ current through the inductance 17A, 17B into a voltage VL1, VL2.

Unit 3 further comprises filtering capacitors C1, C2 and C3 and an inductance 31 connected to the converters 9A, 9B. Converters 9A, 9B are filtered from one side by the filtering capacitors C2, C3 and the inductance 31 and on the other side by the filtering capacitor C1.

As illustrated in FIG. 1, converters 9A, 9B are connected at one end to the electrical power source ST1 via the switch K and the first terminal B1, and on the other side to the second electrical energy storage device ST2 through the third terminal B3.

Unit 3 allows to provide power to the on-board network and to recharge the energy storage device ST2 simultaneously (converters operating in step-down mode). Unit 3 also allows making energy recovery on the energy storage device ST2 and return it to the on-board network (converters operating in voltage step-up mode).

Figure 2:
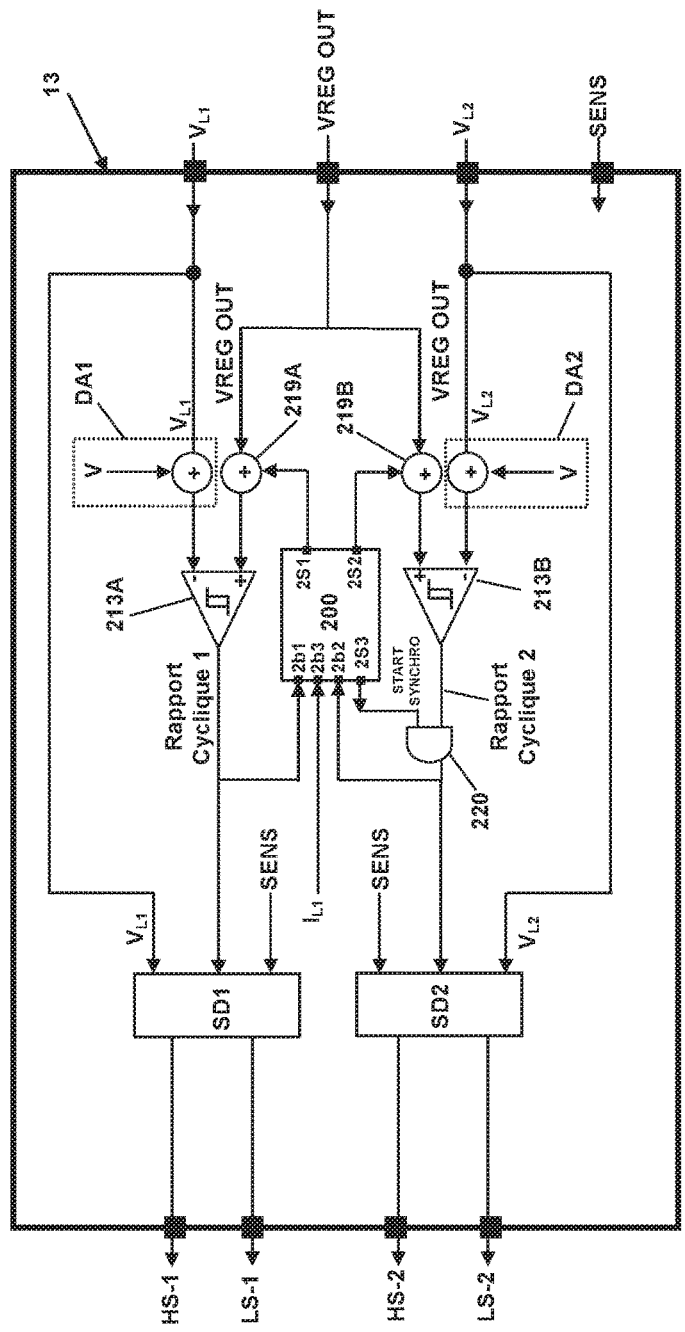
FIG. 2 illustrates a generator of the power supply unit for supplying electrical energy to an on-board network of a vehicle in accordance with the present invention.

Generator 13 of the present invention is illustrated in FIG. 2. Generator 13 realizes, on the one hand, a current control $I_{L1}$ and $I_{L2}$ by the generation of duty cycles (duty cycle 1 and duty cycle 2) in synchronism, and secondly the generation of the LS-1, LS-2, HS-1 HS-2 driving signals of switches 19A, 21A, 19B, 21B by controllers SD1, SD2.

Generator 13 is adapted to receive the control voltage VREG OUT from controller 11, DIRECTION signal provided by calculator 5, and $V_{L1}$ and $V_{L2}$ voltage representative of the current $I_n$ and $I_{L2}$ respectively flowing through inductance 17A and inductance 17B of the means 29A, 29B. Generator 13 is adapted to generate the HS-1 LS1 and HS-2 LS2 driving signals.

Generator 13 comprises a synchronizing device 200, a first generator 213A, and a second generator 213B, for example, a comparator for hysteresis, for generating a switching signal for driving the switches of the converters 9A, 9B to generate a current through the inductances 17A, 17B.

Generator 13 further comprises a first adder 219A, a second adder 219B, a first controller SD1, a second controller SD2, a first current generation stopping device DA1, a second current generation stopping device DA2 and an AND gate (or blocking door) 220.

The AND gate 220 is adapted to receive a synchronization starter signal START SYNCRQ of the synchronizing device 200 and the duty cycle (duty cycle 2) generated by the second hysteresis comparator 213B. The output signal of the AND gate 220 is supplied to the second controller SD2.

The hysteresis comparator 213A is connected to the switches 19A, 21A of the converter 9A through the controller SD1 for transmitting a switching signal to the closing and opening of the switch 19A or 21A for generating a current in 17A inductance. The hysteresis comparator 213B is connected to the switches 19B, 21B of converter 9B via controller SD2 for transmitting a switching signal to the closing and opening of the switch 19B or 21B to generate a current in the inductance 17B.

The hysteresis comparator 213A receives at its inverting input the voltage $V_{L1}$ representative of the current $I_{L2}$ across the inductance 17A and at its non-inverting input of the regulating voltage VREG OUT provided by the controller 11. The hysteresis comparator 213B receives to its inverting input the voltage $V_{L2}$ representative of the current $I_{L2}$ flowing through the inductance 17B and at its non-inverting input the regulated voltage VREG OUT supplied by the controller 11.

Each adder 219A, 219B is adapted to add a synchronization signal supplied by the synchronizing device 200 to the value of the VREG OUT control voltage supplied by the controller 15. The adder 219A is adapted to provide the result to the non-inverting input of hysteresis comparator 213A and adder 219B is adapted to provide the result to the non-inverting input of hysteresis comparator 213B.

Figure 3A:
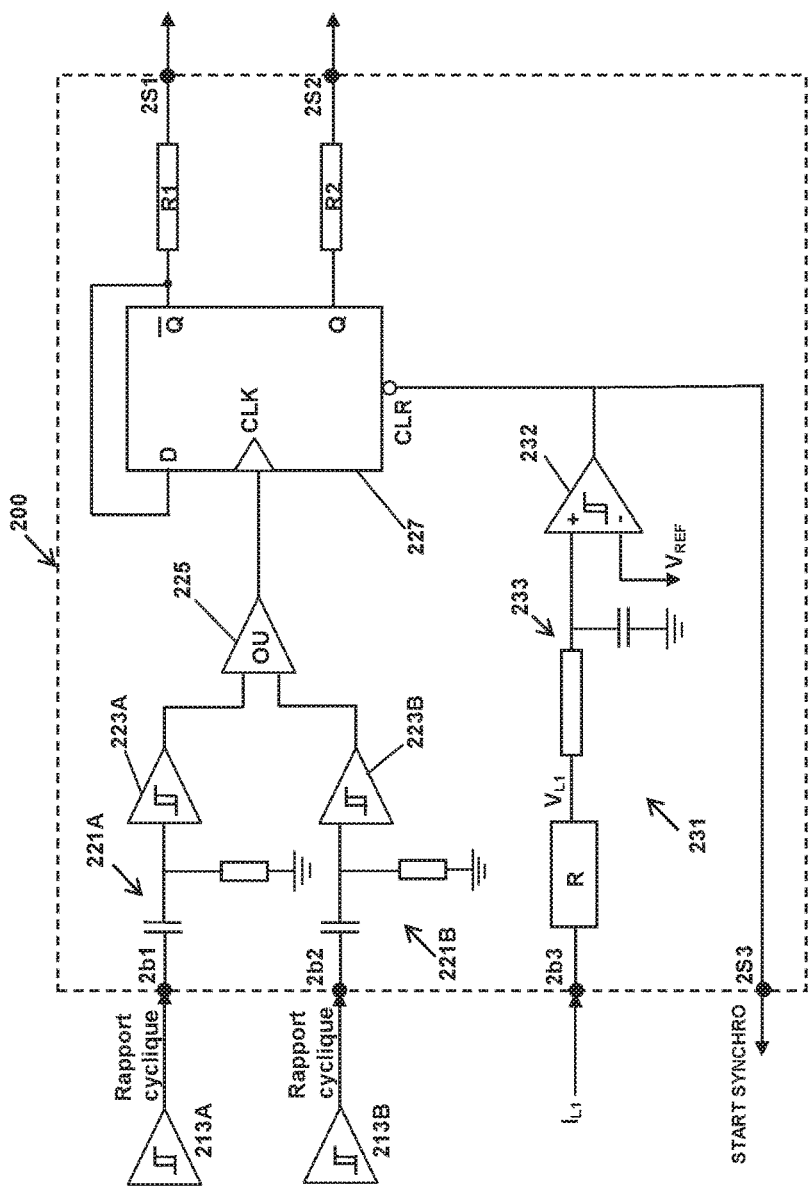
FIG. 3A illustrates a synchronization device for the electric power supply unit according to the present invention.

The synchronizing device 200 according to the present invention is illustrated in detail in FIG. 3A.

The synchronizing device 200 is adapted to receive the switching signal from the hysteresis comparator 213A to a first input terminal 2b1 and to receive the switching signal from the hysteresis comparator 213B to a second input terminal 2b2.

The synchronizing device 200 comprises receiving means for receiving the switching signal generated by each of the converters. The receiving means include a differentiating circuit 221A and a shaping circuit 223A for receiving and processing the switching signal provided by the hysteresis comparator 213A, and a differentiating circuit 221 B and a shaping circuit 223B for receiving and processing the switching signal provided by the hysteresis comparator 213B.

The synchronizing device 200 further comprises means for detecting a type of transition of the received switching signal. The means for detecting a transition type include an OR circuit 225.

The differentiating circuit 221A is connected on one side to the first terminal 2b1 and on the other side to the shaping circuit 223A. The 223A shaping circuit is also connected to an input of the OR circuit. Differentiating circuit 221B is connected on one side to the first terminal 2b2 and on the other side to the shaping circuit 223B. Shaping circuit 223B is connected to the other input of the OR circuit.

The synchronizing device 200 further comprises means for generating a synchronization signal when a transition is detected and means for providing the synchronization signal to one of the adders 219A, 219B.

The means for generating a synchronization signal when a transition is detected include a D 227 flip-flop (toggle).

The output of the OR circuit is connected to a clock (CLK) input of the D flip-flop. A Q output of the D flip-flop is connected to a resistor R1 (for example, 200K)) and the complemented output Q (Qbarre) of the D flip-flop is connected to a resistor R2 (for example, 200k0). The other input D of the D flip-flop is connected to the complemented output Q (Qbarre) and resistor R1.

The resistor R1 is also connected to a first output terminal 2S1 and the resistor R2 is connected to a second output terminal of the 2S2 device 200.

The D flip-flop is adapted to alternately generate a synchronization signal at the Q output and a synchronization signal at the complemented output of Q (Qbarre) every time the CLK clock receives an input of the OR circuit.

The means for providing the synchronization signal to one of the adders 219A, 219B include the D flip-flop, the resistor R1 connected to the first output terminal S1 and the resistor R2 connected to the second output terminal S2.

The synchronizing device 3 receives in input switching output signals of each hysteresis comparator 213A, 213B. The switching signals are pulse-width modulated signals (PWM) and the intensity of the current generated in the inductances 17A, 17B is determined by the duty cycle of these signals.

Each transition of the switching output signal of comparator 213A is processed by the differentiating circuit 221A and 223A, the shaping circuit and supplied to the input of the OR circuit. Each transition in the output switching signal of the comparator 213b is processed by the differential circuit 221B and the shaping circuit 223B and supplied to the other input of the OR circuit.

Only positive transitions are taken into account by the OR circuit 225 and are supplied to the input clock CLK of the D flip-flop. The D flip-flop alternates the Q and Qbarre output states at each positive transition on its clock CLK input received from the OR circuit. A synchronization signal (e.g., a signal of +5V) is produced alternately at the Q and Qbarre outputs. A synchronization signal is thus provided to a different adder 219A or 219B (through the resistors R1, R2) and in a sequential order (for example, 219A, 219B, 219A, 219B . . . ) whenever positive transition is detected by the OR circuit (in the case where the unit 3 consists of three converters 9A, 9B and 9C, the order is for example, 219A, 219B, 219C, 219A, 219B, 219C . . . ).

The synchronization signal is supplied to the adder 219A or the adder 219B through the resistor R1 or R2. The adder 219A or 219B adds the value of the regulated voltage VREG OUT to the synchronization signal (for example, a voltage of +290 mV). The result is supplied to the non-inverting input of hysteresis comparator for changing the magnitude of the hysteresis of the comparator.

A voltage of 0V is supplied to another adder and the hysteresis comparator connected to the other adder receives only the value of the regulated voltage VREG OUT at its non-inverting input.

The alternative supply of the synchronizing signal to the adder 219A and adder 219B in order to change the magnitude of the hysteresis of the comparator when a positive transition is detected by the OR circuit synchronizes the operation of the converters 9A and 9B operating at variable frequencies to synchronize the current generation inductances 17A, 17B by the converters 9A, 9B.

The synchronizing device 200 further comprises a synchronization starter device 231 to ensure proper synchronization of the duty cycle 1 and duty cycle 2 signals. The synchronizing unit 200 is adapted to provide a synchronization signal to a predetermined converter.

The synchronization of the starter device 231 comprises a comparator 232, a linear converter current/voltage gain A and a shaping circuit 233 (for example, a resistor-capacitor circuit (RC circuit)) suitable for preventing a simultaneous starting of the two synchronization converters 9A, 9B connected on one side to the non-inverting input of comparator 232 and the other side to an input terminal 2b3 via the linear current converter/voltage gain of R. Unit 231 comprises in addition a reference voltage source $V_{REF}$ (for example, a fixed voltage of 2.5V) connected to the inverting input of comparator 232. The output of comparator 232 is connected to a reset input CLR of the D flip-flop Unit 231 ensures proper synchronization starts. It is configured to generate a synchronization starter signal START SYNCHRO. 2b3 input terminal receives the value of the current $I_{L1}$ (or $I_{L2}$) (an image of the current $I_{L1}$ (or $I_{L2}$)) passing through the inductance 17A (or inductance 17B) in the supply of a converter 9A or 9B or unit 3.

The image of the current flowing in the inductance 17A ($V_{L1}$) is filtered by the RC circuit and compared by the comparator 232, to the value of the reference voltage VREF. The comparator 232 generates as output the synchronization starter signal SYNC START. This signal is sent to the reset input CLR of flip-flop 227 to reset the output of flip-flop 227 and the AND gate 220 via an output terminal 2S3.

When starting unit 3, only the converter generates a 9A current. When the current $I_{L1}$ is less than a predetermined value (for example, a low value <3 Amps), the SYNC START signal output of the comparator 232 remains at 0V and requires resetting the D flip-flop so that a synchronization signal (e.g., a signal of +5V) is produced at the Q output and a 0V signal is produced at the Qbarre output. A synchronization signal is thus supplied to the adder 219A through the first output terminal 251. The D flip-flop is thus able to always supply a synchronization signal to a predetermined output terminal (2S1) when it receives a START SYNC signal having a value of 0V. Thus the output 2S1 of the synchronizing device 200 is initialized to a positive voltage (e.g. +290 mV) and the output 2S2 is initialized to a zero voltage.

Furthermore, the AND gate 220 does not provide the duty cycle signal to the second controller SD2 when it receives a SYNC START signal having a value of 0V.

When the $I_{L1}$ current exceeds this predetermined value (3 Amps), the synchronization starter signal START SYNCHRO is starting, for example, at a 5V value, so that a reset is not imposed on the D flip-flop and the AND gate 220 provides the duty cycle signal 2 to the second controller SD2. The D flip-flop becomes fully operational and the signals supplied to the output terminals 2S1 and 2S2 outputs are in alternate (as shown above) and perform the voltage offset by means of adders 219A and 219B. For example, unit 200 provides a synchronizing signal at output 2S2 when a positive transition is detected by the OR circuit (and then at the output 2S1, 2S2, 2S1, 2S2 . . . ). Proper synchronization of duty cycle 1 and duty cycle 2 is thus achieved.

Figure 3B:
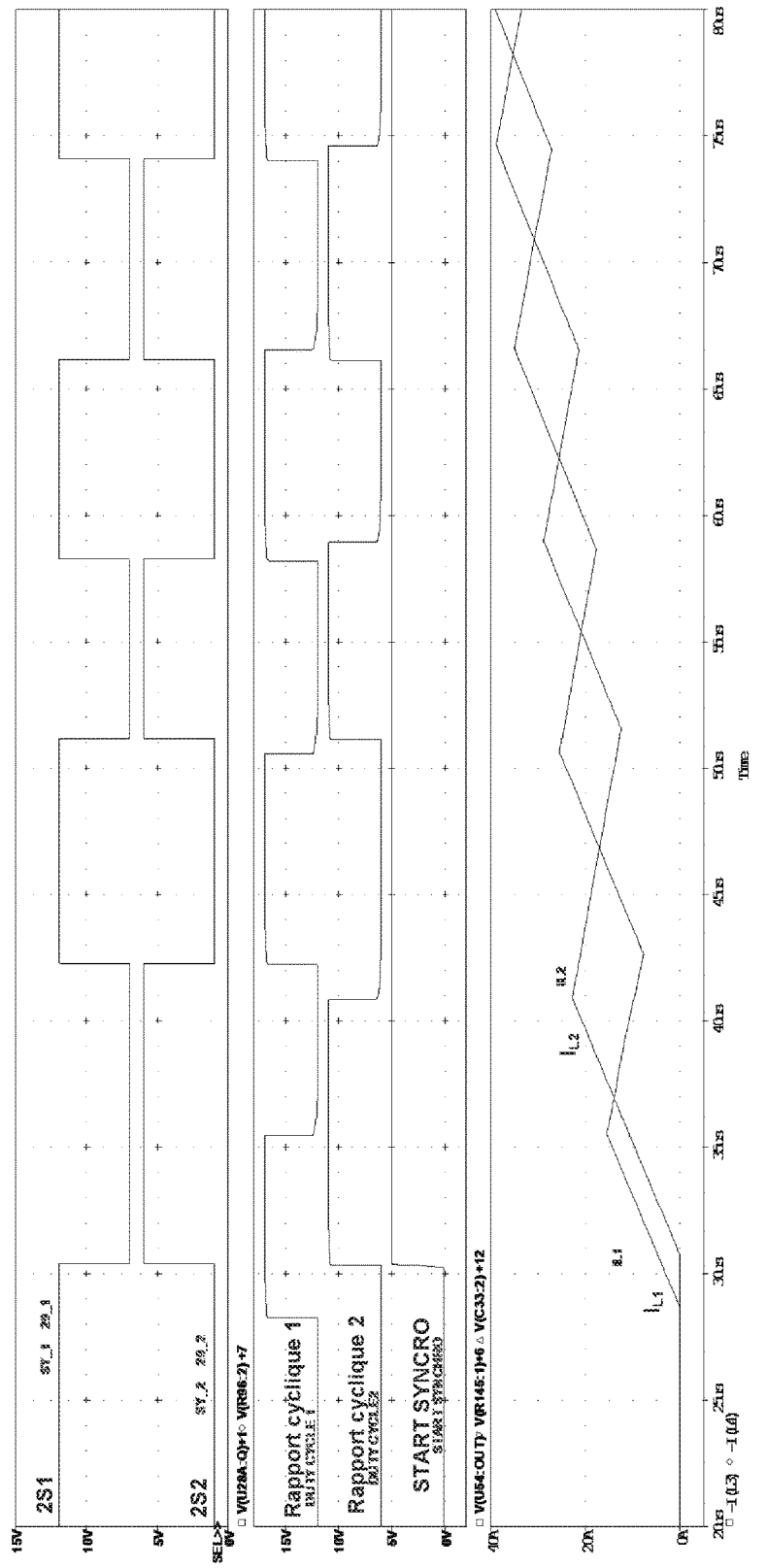
FIG. 3B illustrates the operation of a starter device for the synchronization of the synchronization device according to the present invention.

FIG. 3B illustrates the operation of the synchronization starter device 231.

Figure 4:
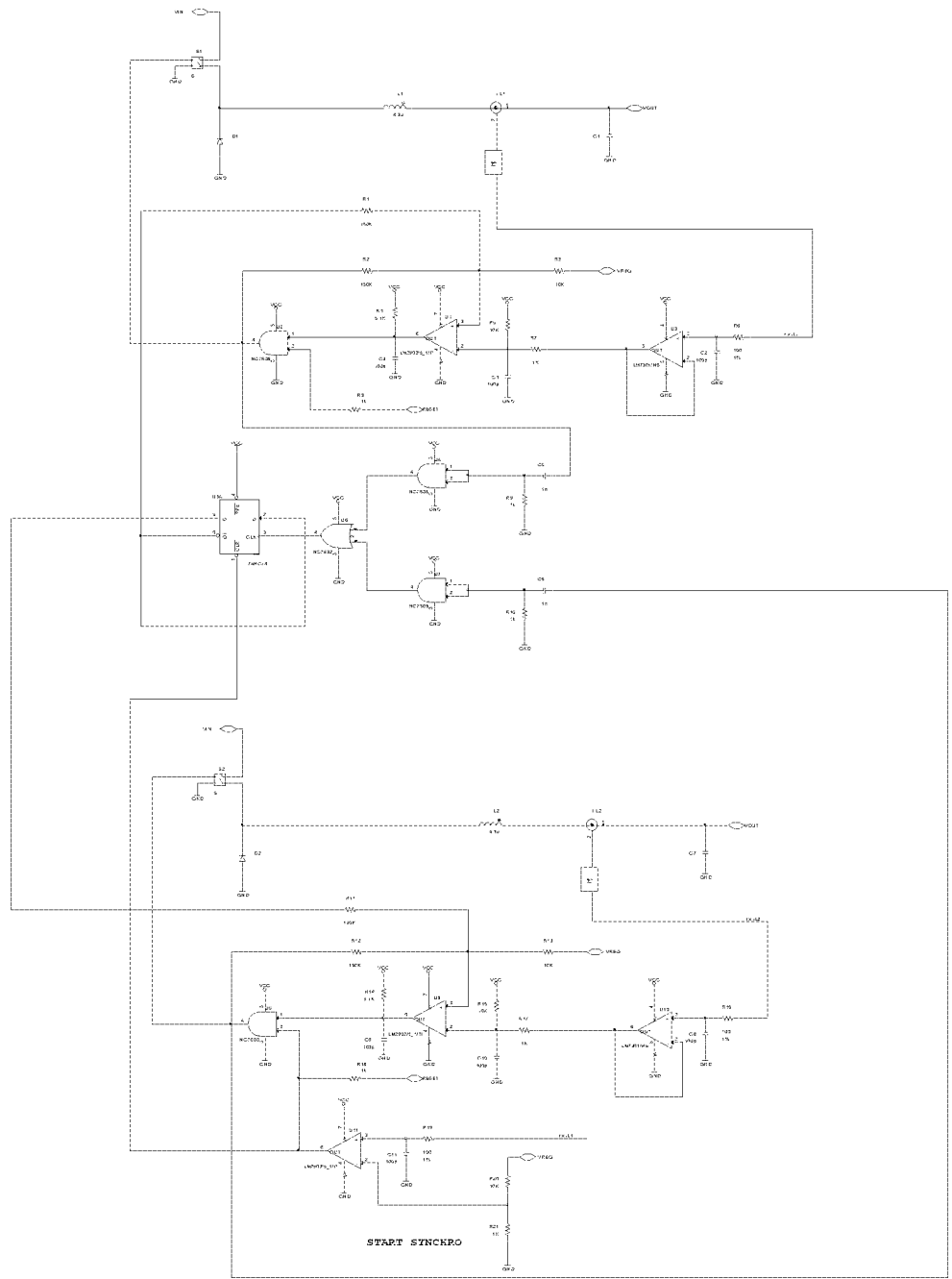
FIG. 4 illustrates an exemplary application of the synchronization device of the power unit in an on-board electrical power network according to the present invention.

FIG. 4 illustrates an implementation of the synchronizing device 200.

Figure 5:
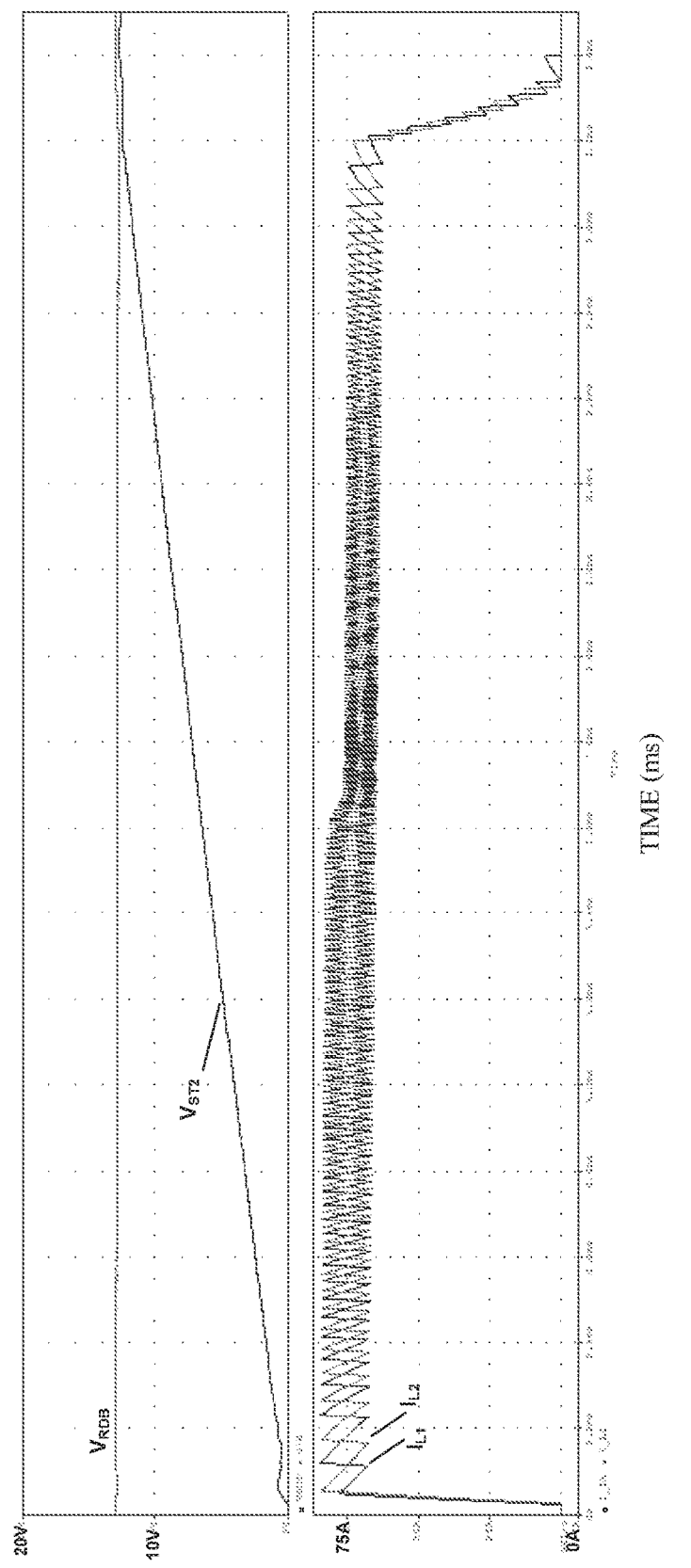
FIG. 5 shows the synchronized evolution of the current through the inductance of each converter operating in a voltage step-down mode for the system illustrated in FIG. 1.
Figure 6:
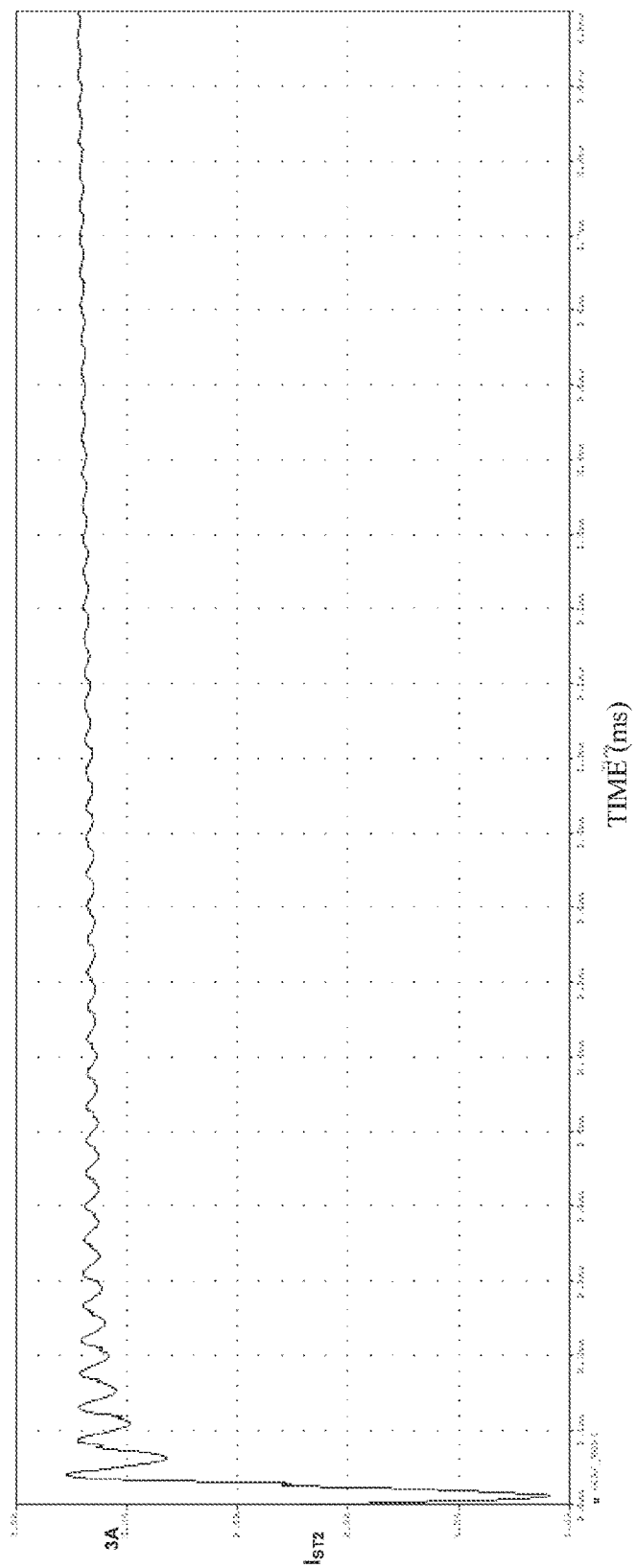
FIG. 6 shows the effective current in the energy storage device of the system shown in FIG. 1.

FIG. 5 illustrates the value of the current $I_n$ flowing through the inductance 17A and the value of the current $I_{L1}$ through the inductance 17B when converters 9A and 9B operate in step-down voltage mode. FIG. 5 shows that the current generation $I_{L1}$ and $I_{L2}$ is synchronized and that the system 1 provides a stable $V_{ST2}$ output voltage and charges the energy storage device ST2 to a requested value of 12V. FIG. 6 shows an effective current of 3 in the energy storage device ST2.

Figure 7:
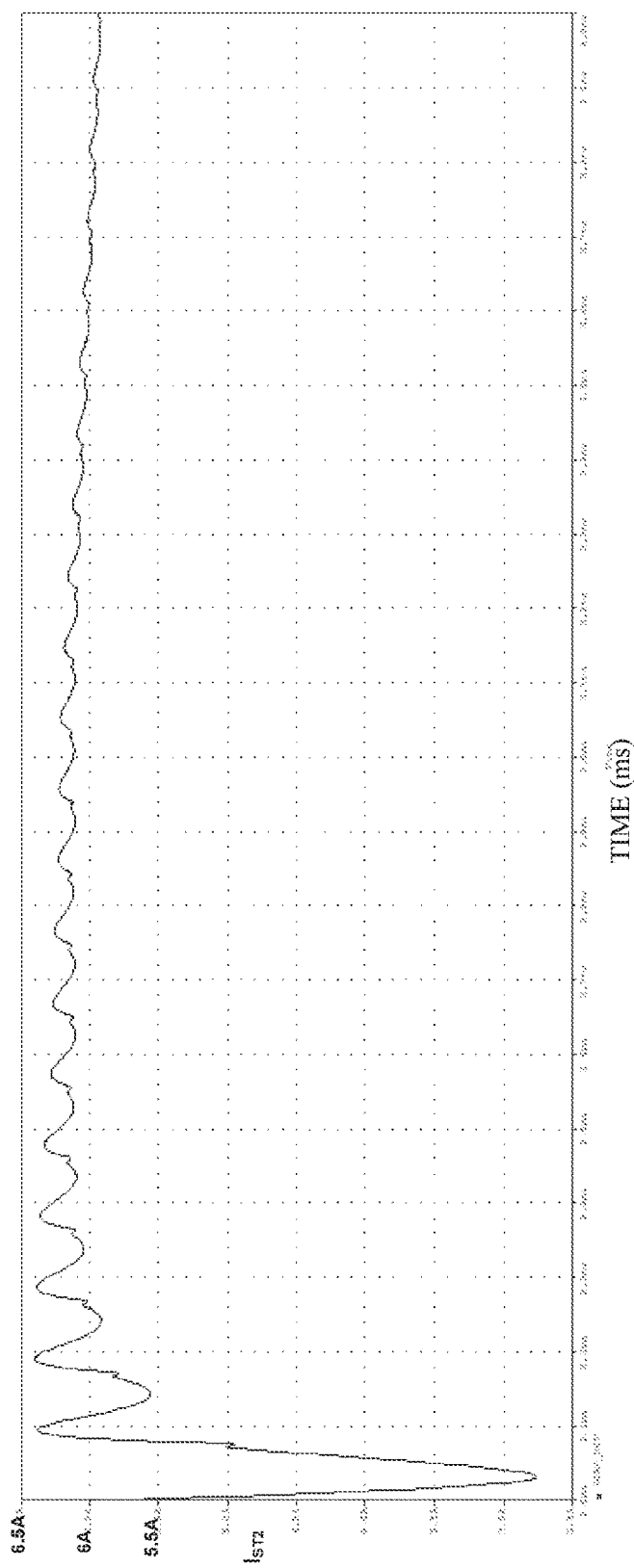
FIG. 7 shows the effect of a failure of the synchronization of the DC/DC converters in step-down voltage mode.
Figure 8:
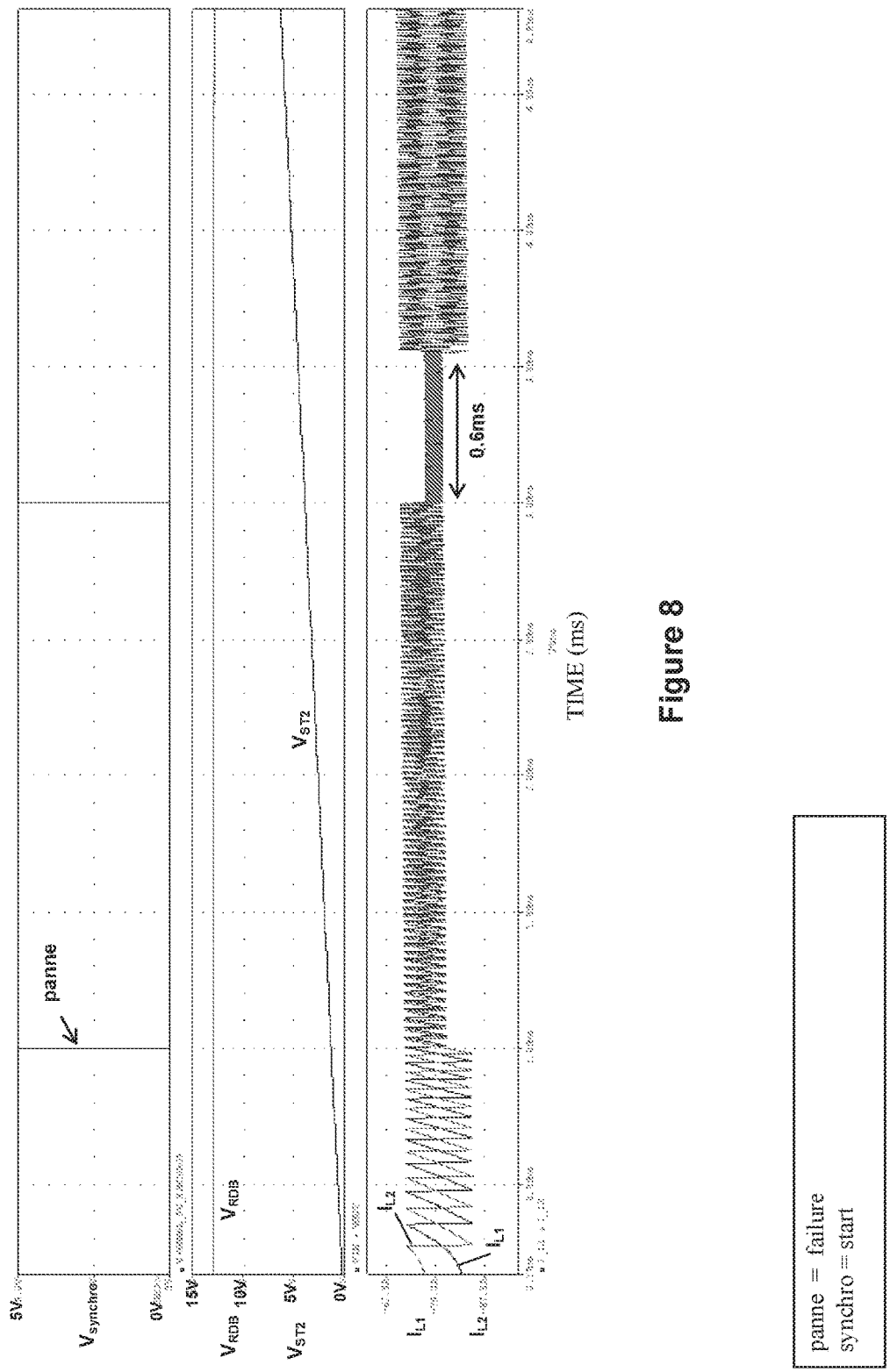
FIG. 8 illustrates the effect of a synchronization failure of the converters for 2 minutes.

FIG. 7 illustrates the effect of a failure of the synchronization of converters DC/DC step-down voltage mode. There is no full stop of all converters at the moment of the breakdown and the effective current in the energy storage device ST2 is doubled (6A). FIG. 8 illustrates a synchronization failure of 2 minutes. The two step-down converters operate during the outage without interlacing. After the disappearance of the failure, the converters are synchronized after a period of time (0.6 minute in FIG. 8).

Figure 9:
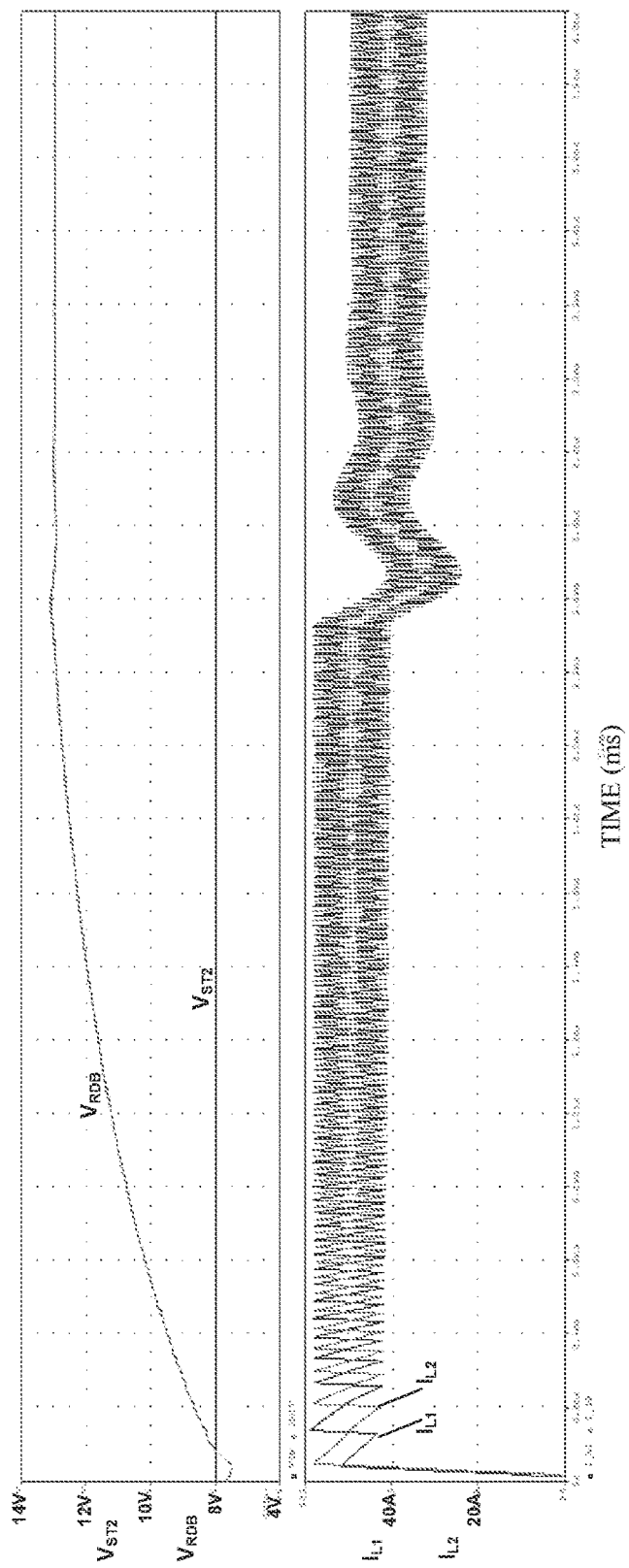
FIG. 9 shows the synchronized evolution of the current through the inductance of each converter operating in step-up voltage mode.

FIG. 9 illustrates the value of the current $I_{L1}$ flowing through the inductance 17A and the value of the current $I_{L2}$ flowing through the inductance 17B when converters 9A and 9B operate in a step-up voltage mode. FIG. 9 shows that the generation of current $I_{L1}$ and $I_{L2}$ is synchronized and that the system 1 provides a stable output voltage VRDB up to the requested value of 13V.

Figure 10:
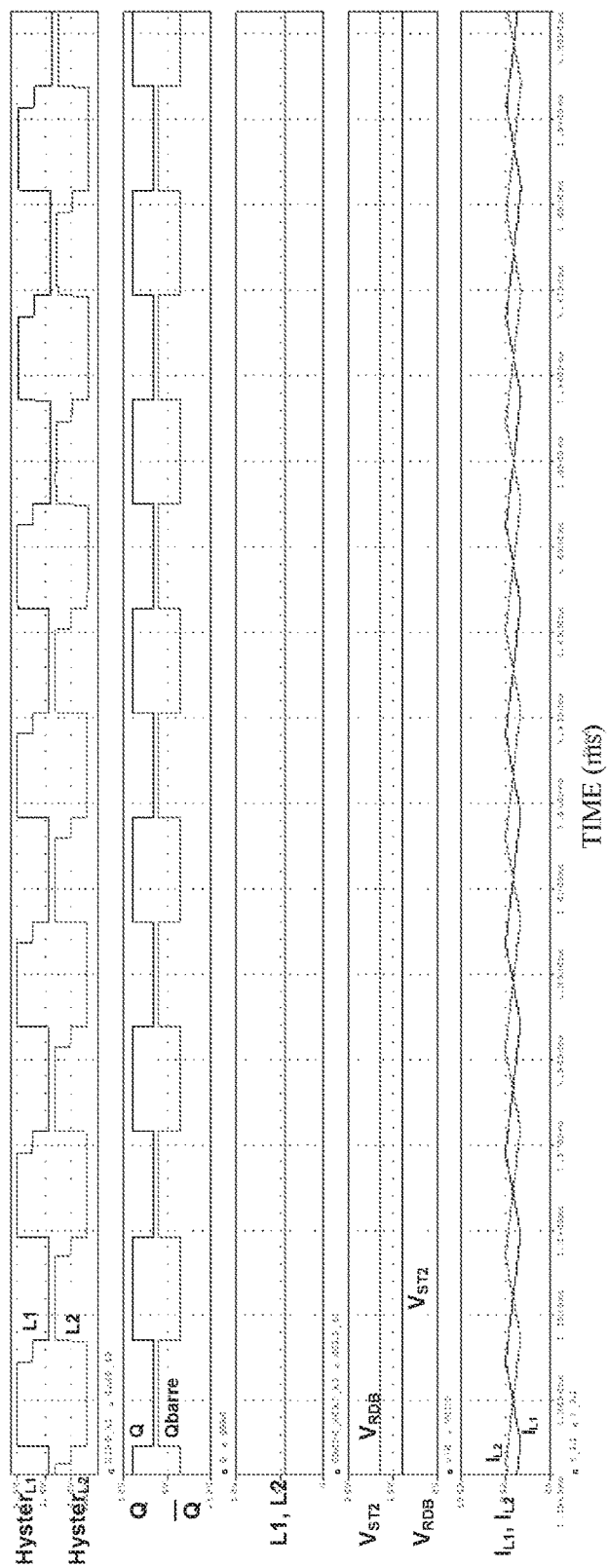
FIG. 10 illustrates the hysteresis signal, the output values Q and Qbarre, the inductance value L1, the inductance value L2 and the currents in the inductances L1, L2 when the inductance value L1 is equal to the inductance value L2.

FIG. 10 illustrates the hysteresis signal, the output values of Q and Qbarre, the inductance value L1 of 17A, the inductance value L2 of 17B and the currents in the inductances L1 (17A), L2 (17B) when the value of the inductance L1 (17A) is equal to the value of the inductance L2 (17B).

Figure 11:
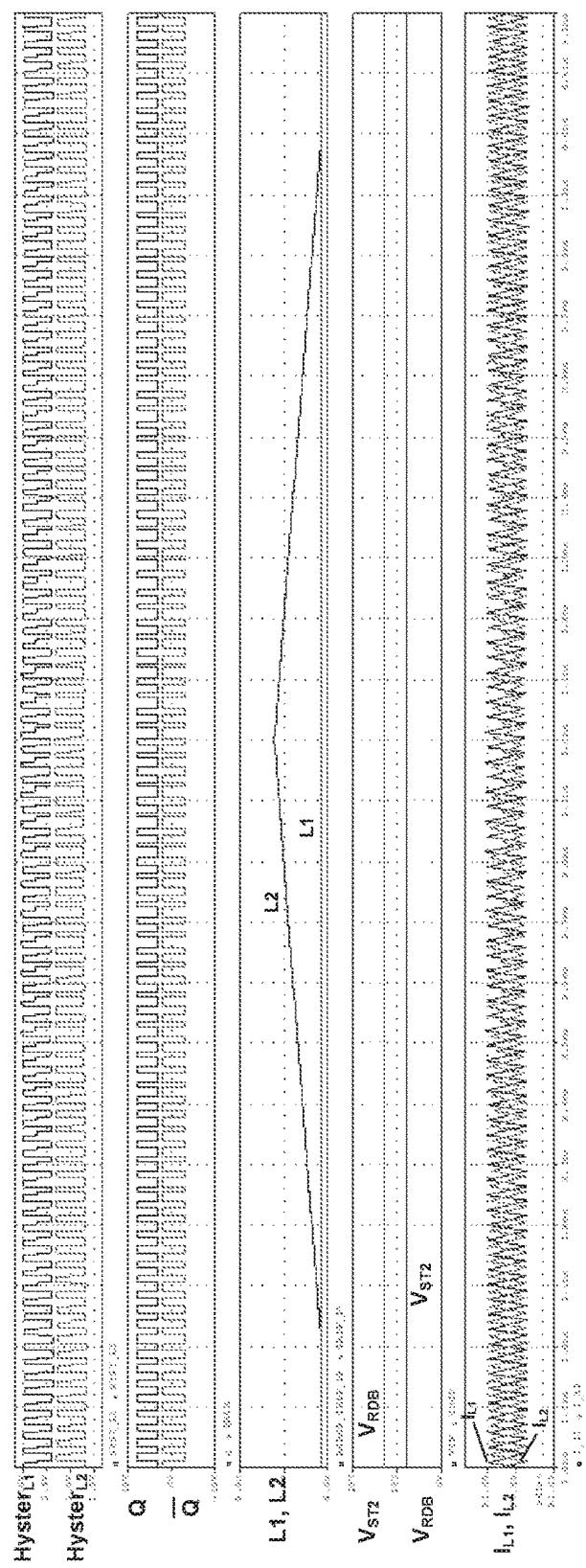
FIGS. 11 and 12 illustrate that an inductive component deviation of +50% (self-switching) does not shut (stop) the synchronism.
Figure 12:
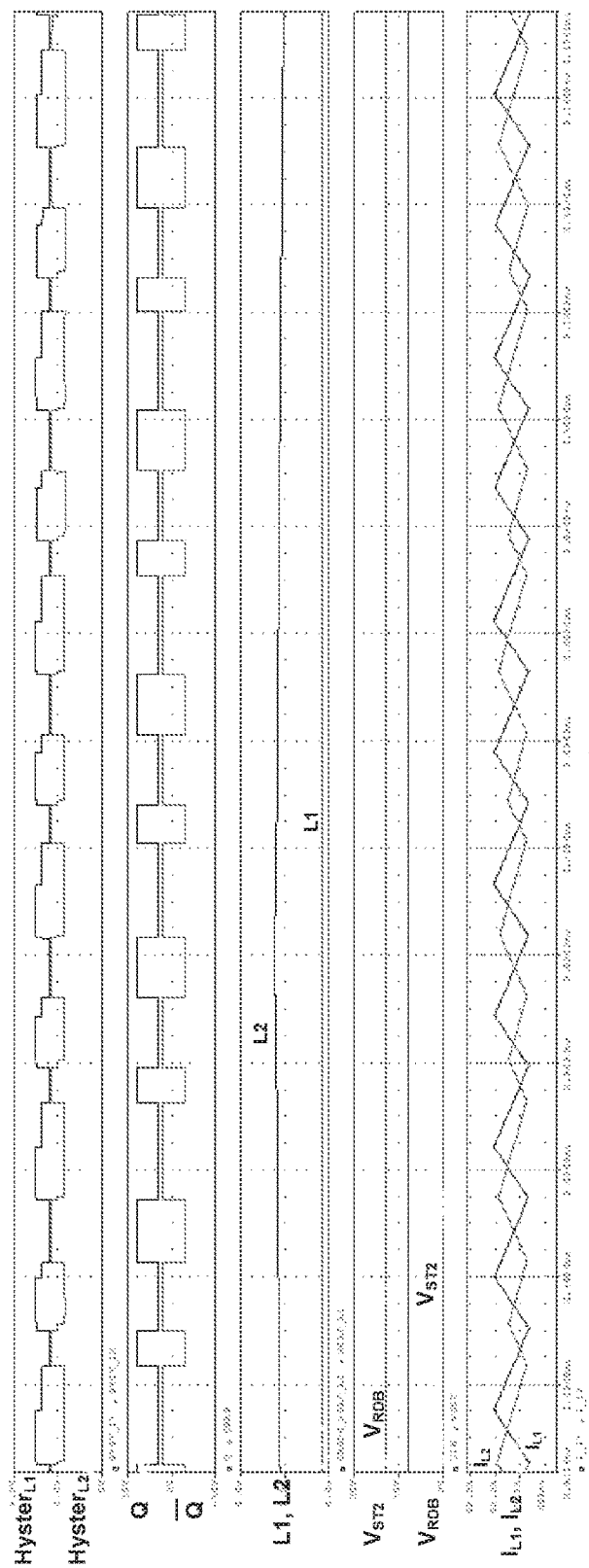

FIGS. 11 and 12 illustrate the hysteresis signals, the output values of Q and Qbarre, the inductance value L1 of (17A), the inductance value L2 of (17B) and the currents in the inductances L1 (17A), L2 (17B) during a deflection of the inductance L1 (17A) to the inductance L2 (17B) (L1 L2=150%). These figures show that inductive component deviation +50% (self-switching) does not shut synchronism.

Figure 13:
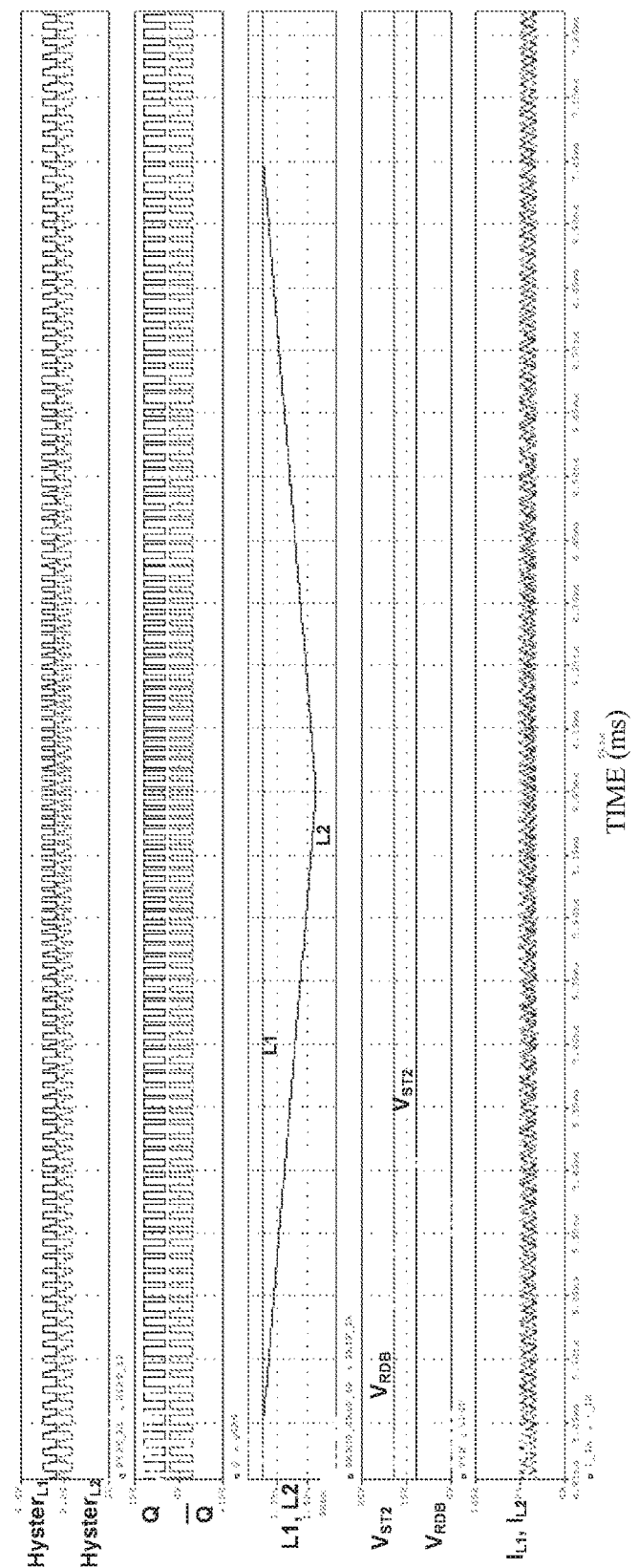
FIGS. 13 and 14 illustrate that an inductive component deviation of −50% does not shut (stop) the synchronism.
Figure 14:
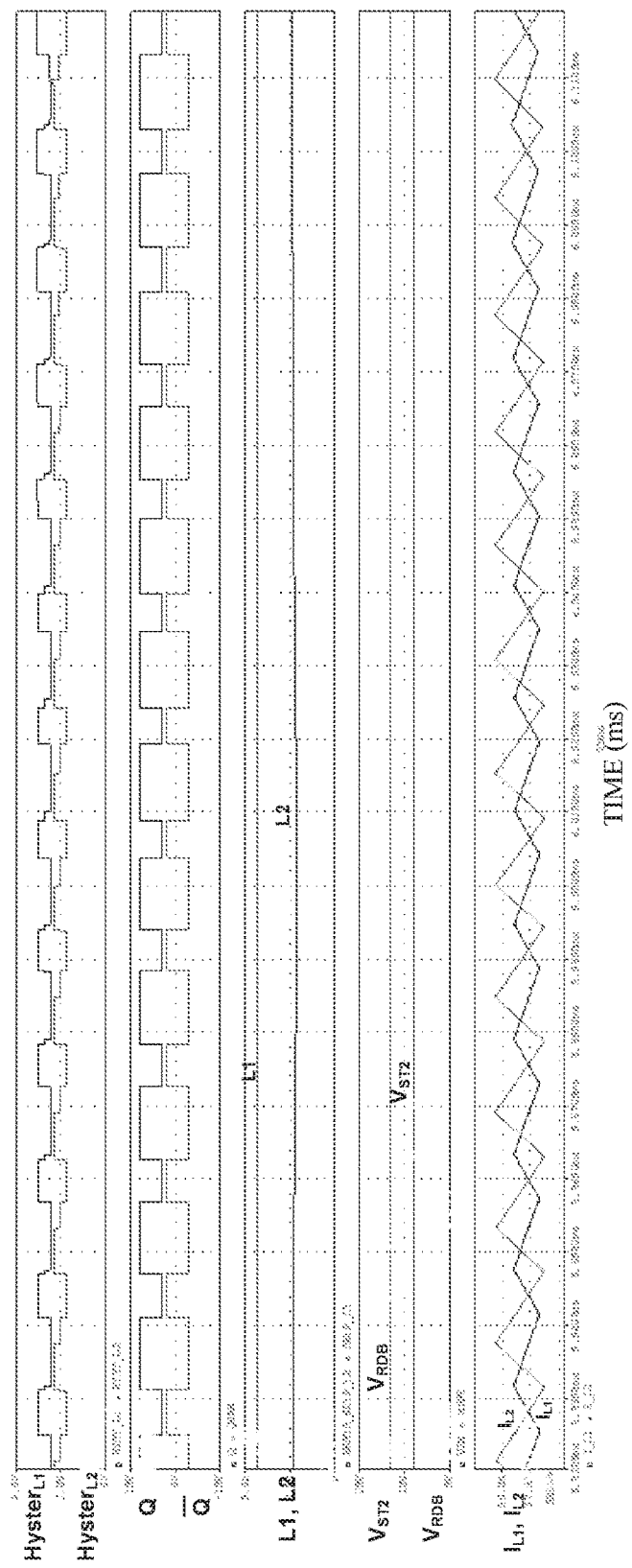
Figure 15:
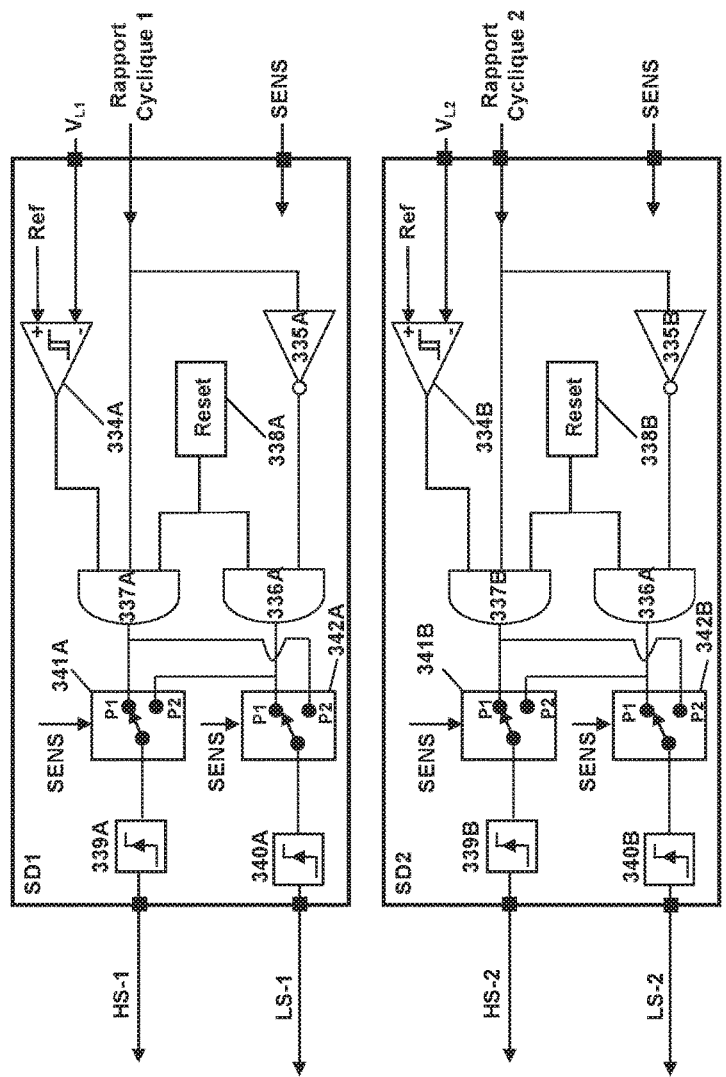
FIG. 15 shows the controllers of the generator of the power supply unit according to the present invention.

FIGS. 13 and 15 illustrate the hysteresis signals, the output values of Q and Qbarre, the inductance value L1 (17A), the inductance value L2 (17B) and the currents in the inductances L1, L2 in a deflection of the inductance L1 to the inductance L2 (L2=L1−150%). These figures show that inductive component deviation of −50% did not shut synchronism.

The present invention thus provides a synchronizing device 200 for synchronizing the operation of a plurality of current converters DC/DC variable frequency throughout the converters operating frequency range. Step-down or step-up converters can operate with interlace regardless of the operating frequency converter (for example, in a range of 4 kHz to 40 kHz). In addition, a synchronization operation failure does not result in the forced shutdown of all converters. They then work on their own respective frequency. In addition, a strong drift of the inductive component (+/−50%) (self-switching) does not stops the synchronism. Thus, it is not useful to perform numerical calculations for synchronization correcting the excesses of components of the converters. Furthermore, the present invention reduces the ripple current effect in the filtering capacity.

The SD1 and SD2 controllers according to the present invention are illustrated in detail in FIG. 15.

The SD1 controller is adapted to receive the switching signal (duty cycle 1) at the output of comparator 213A, the DIRECTION signal provided from the calculator 5, and the $V_{L1}$ voltage, representative of the $I_{L1}$ current flowing through the inductance 17A of the 29A means. SD1 controller is adapted to generate HS-1 and LS-1 control signals.

The SD2 controller is adapted to receive the switching signal (duty cycle 2) at the output of the 213B comparator, the DIRECTION signal provided by calculator 5, and the representative $V_{L2}$ voltage of the $I_{L2}$ current flowing through the 17B inductance of the 29B means. SD2 controller is adapted to generate the HS-2 and LS-2 control signal.

Each controller SD1 or SD2 functions as a driven diode and allows a high duty cycle (>50%) without instability.

Each SD1 or SD2 controller includes a 334 comparator, a 335 inverter, an AND logic gate having two 336 inputs, an AND logic gate having three 337 inputs, 338 means for providing a reset signal (RESET), signal retarders 339, 340, a first switch 341 and second switch 342.

The first switch 341 and the second switch 342 are adapted to receive the DIRECTION signal and suitable for transferring a switching signal to the signal from synchronization 339 and the signal 340 according to the synchronization value of the DIRECTION signal. For example, when the value of the DIRECTION signal is equal to 0V (a logic 0 level and step-down voltage mode), a switching signal emitted from 336 is transferred to signal retarder 339 through terminal P2, and fed to switch 19 of the converter. A switching signal emitted from 337 is transferred to signal retarder 340 through terminal P2 and fed to switch 21. When the value of the DIRECTION signal is equal to 5V (a logic 1 level and step-up voltage mode), a switching signal emitted from 336 is transferred to signal retarder 340 through terminal P1, and fed to switch 21 of the converter. A switching signal emitted from 337 is transferred to the signal retarder 339 through terminal P1 and fed to switch 19.

The means 338 in order to provide a reset signal to impose a state 0 on LS1 and HS1 outputs of the signal retarders 339, 340 when the output of the means 338 is 0 during the initialization phase of the internal power supply (+5V for example). In this case, switches 19 and 21 are open.

Comparator 334 compares the value $V_{L1}$ to a reference voltage REF (for example, 0.5V corresponding to $I_{L1}$ (or $I_{L2}$)=2 A). If this current is less than 2 Amps, then the switch 21 opens and does not let a negative IL through when DIRECTION=0, then the switch 19 opens and does not let the negative IL current when DIRECTION=5V. Signals retarders 339, 340 prohibit the simultaneous conduction of both switches 19 and 21.

Each controller SD1, SD2 offers an on-state impedance with a much lower passing state than that of a passive diode and thus improves converter efficiency and limits its thermal heating. Moreover, it allows keeping the stability of the control to a greater than 50% duty cycle.

Figure 16:
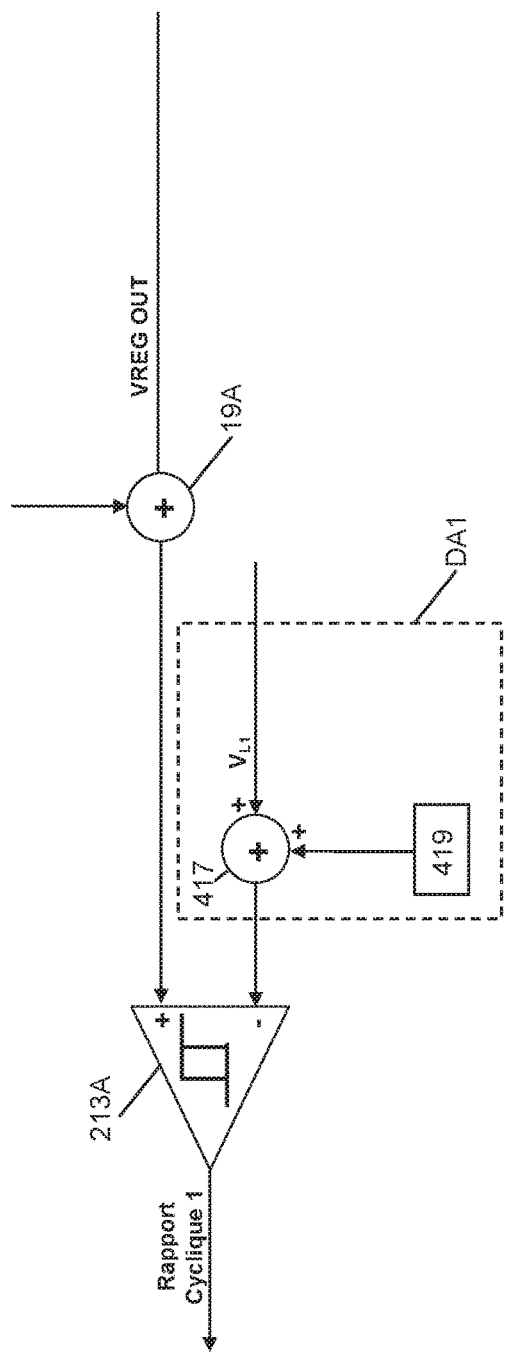
FIG. 16 shows a power generation stopping device of the generator of the power supply unit according to the present invention.

The first power generation stopping device DA1 of generator 13, according to another aspect of the present invention is illustrated in detail in FIG. 16. The second power generation stopping device DA2 is identical to first current generation stopping device DA1.

The power generation stopping device DA1 is able to change the value of the voltage applied to the inverting input of the comparator with hysteresis 213A in order to stop the switching of the switch and the generation of the current IL through the inductance.

The power generation stopping device DA1 is arranged between the inverting input of comparator 213A and the means 29 supplying a voltage VL representative of the current passing through the inductance.

The current generation stopping device DA1 includes an adder 417 and means 419 providing a fraction of a general supply voltage (e.g. Vcc=+5V) of the device 3. The means 419 for providing a fraction of the general supply voltage comprise, for example, a divider bridge of two resistors.

The adder 417 is connected to the inverting input of the comparator and is adapted to add an offset voltage, which is the fraction (for example 0.5V) of the general voltage supply, to the voltage $V_{L1}$ representative of current flowing through the inductance.

The adder 417 supplies the result to the inverting input of the comparator. The resulting voltage produced at the inverting input of the comparator is equal to $(R \times I_{L1})+0.5$ V. When the voltage VREG OUT is less than this resulting voltage $(R \times I_{L1})+0.5$ V, the comparator goes to the low state (0 volts), generating the stop of the converter switch.

Figure 17A:
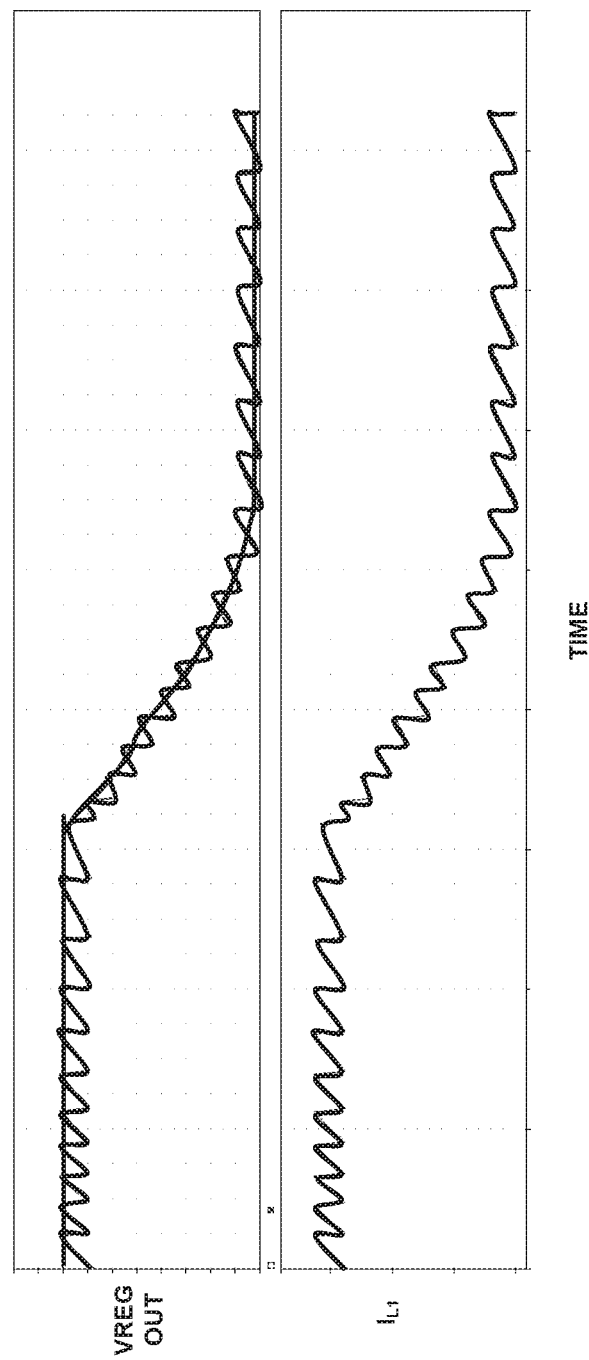
FIG. 17a shows the default of converters known in the prior art that fails to properly stop when the control voltage VREG OUT reaches a value close to 0V.

FIG. 17a shows the default converters known in the prior art that did not properly stop when the control voltage VREG OUT reached a value close to 0V. When VREG OUT reaches a value close to 0V, current $I_{L1}$ is always produced by the inductance. The current does not cancel itself and the converter still works when the desired operation is a final stop. The control system is unstable.

Figure 17B:
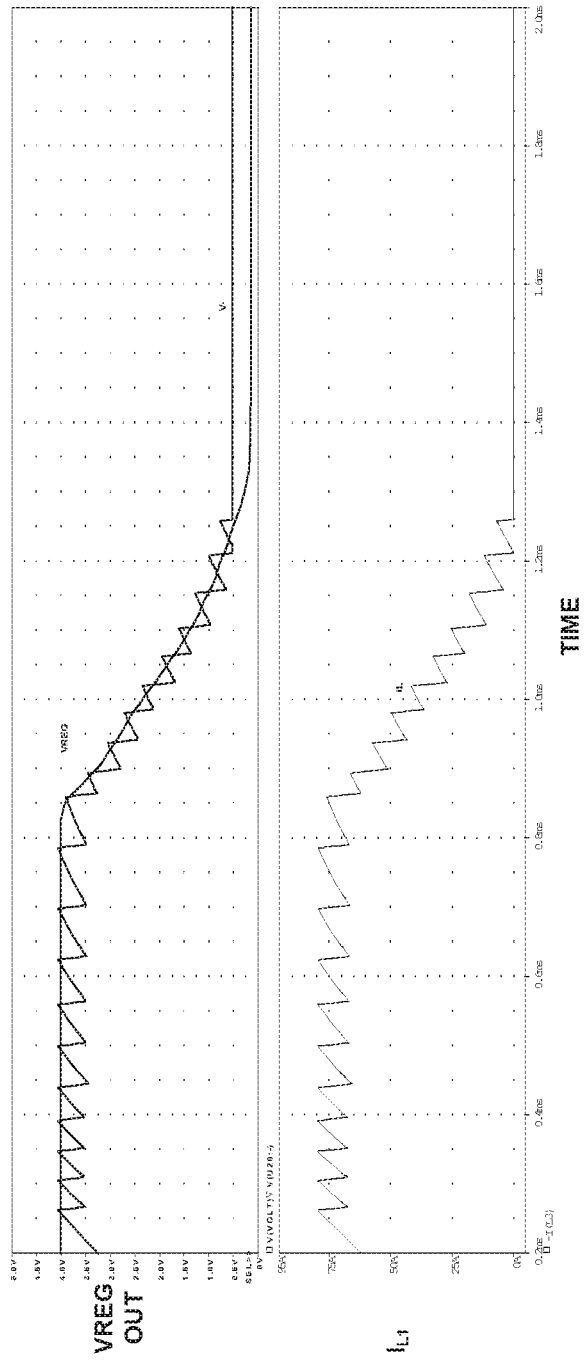
FIG. 17b shows the improvement provided by the present invention that properly stops when VREG OUT reaches a value close to 0V (current $I_{L1}$=0)

In contrast, FIG. 17b shows the improvement provided by the present invention which properly stopped when VREG OUT reaches a value close to 0V (current $I_{L1}$=0) because the current is canceled by the application of the offset voltage by the current generating stopping device DA1. The control system is now stable.

Figure 18:
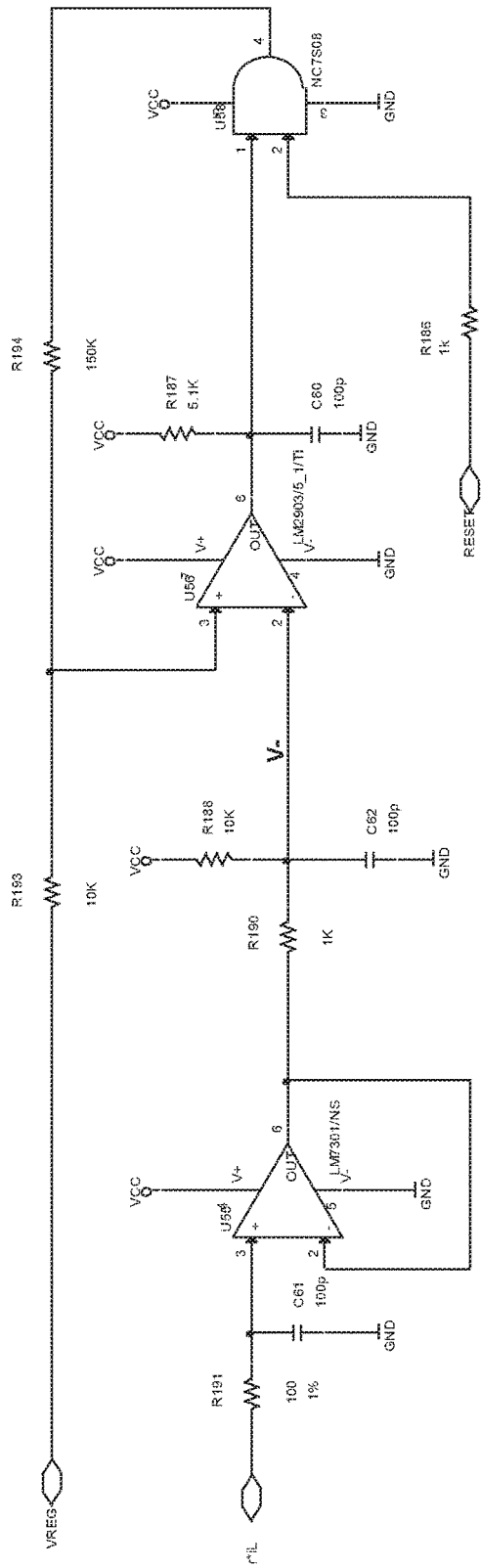
FIG. 18 shows an example of an application of the current generation stopping device.

FIG. 18 illustrates an exemplary application of the power generation stopping device DA1.

Figure 19:
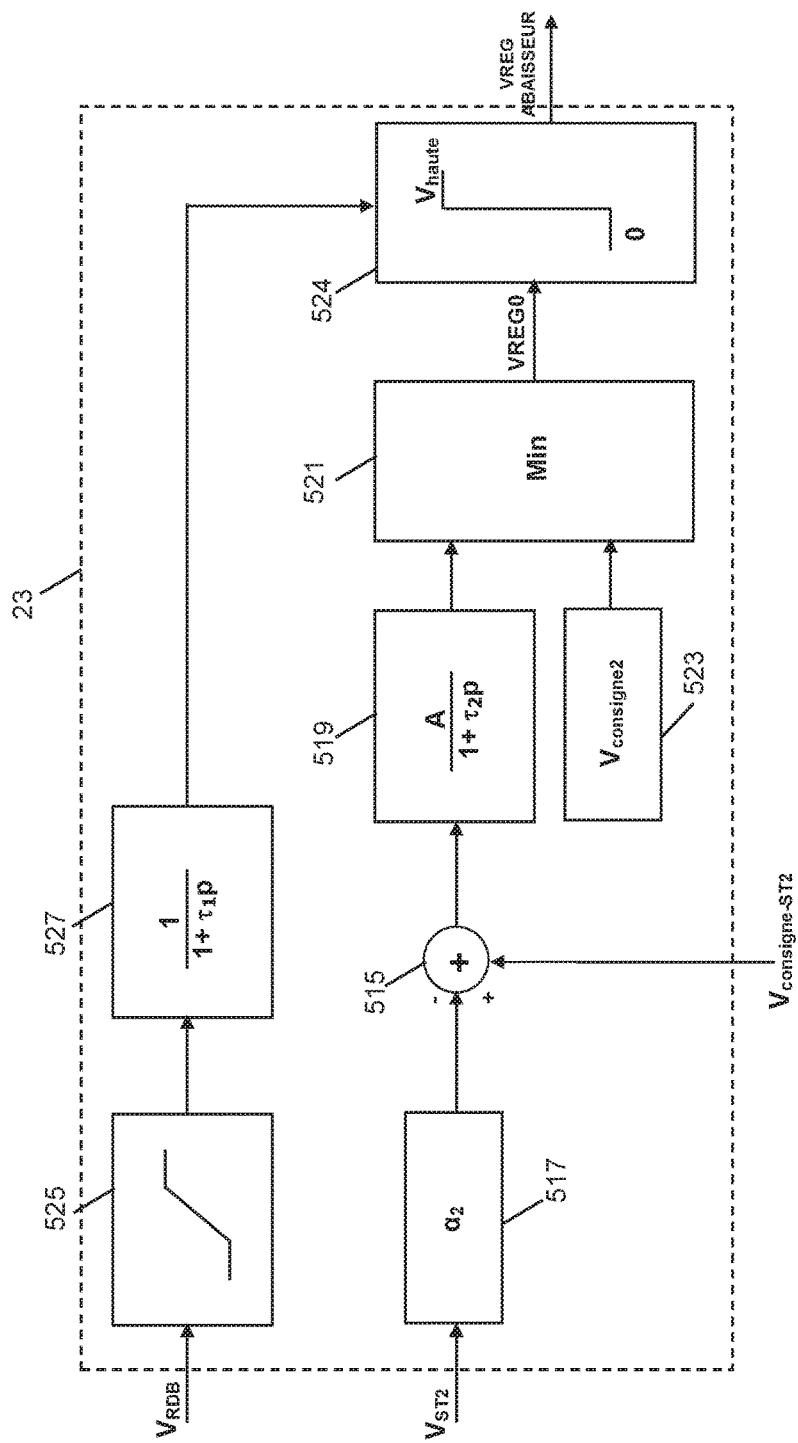
FIG. 19 shows in detail a first controller for the operating mode of the step-down voltage of the controller of the electric power supply unit according to the present invention.

The first controller 23 for the step-down mode of the voltage regulator 11, according to another aspect of the present invention is illustrated in detail in FIG. 19.

The first controller 23 is adapted to receive a voltage feedback signal from an output voltage $V_{ST2}$ converters (feedback), a pro-action signal voltage from an input voltage $V_{RDB}$ (feedforward) and a $V_{consigne-ST2}$ reference signal. The first controller 23 is adapted to determine a control voltage value VREG ABAISSEUR (STEP-DOWN) from the value of the output voltage $V_{S12}$, of the value of the voltage $V_{RDB}$ of entry and the value of $V_{consigne-ST2}$ reference signal. The control voltage VREG ABAISSEUR (STEP-DOWN) is supplied to the selection device 27 which is adapted to select the control voltage VREG ABAISSEUR (STEP-DOWN) when the value of the DIRECTION signal is equal to 0V (a logic level of 0 and step-down mode of operation). Then, the selection device 27 provides the control voltage VREG ABAISSEUR (STEP-DOWN) (control voltage VREG OUT) to the generator 13 to regulate the current flowing through the inductances 17A, 17B to the value of the control voltage VREG ABAISSEUR (STEP-DOWN).

The first controller 23 includes an adder 515, attenuating means 517, a proportional-integral corrector (PI) 519, a comparison device 521, means for providing a reference voltage $V_{consigneST2}$ 523 and a voltage limiter 524.

The adder 515 is adapted to perform a subtraction of the reference voltage $V_{consigne-ST2}$ to a fraction of the output voltage $V_{S12}$ (feedback) provided by the attenuating means 517. The output error of the adder 515 is corrected by the Proportional-Integral corrector (PI) 519.

The comparison device 521 is adapted to compare the voltage from the proportional-integral corrector (PI) 519 and the reference voltage $V_{consigne2}$ provided by the means for providing a reference voltage 523 and it is adapted to copy, at the output, the minimum value of the two voltages and to supply this voltage to the voltage limiter 524 as VREG0 voltage regulation.

The means for providing a reference voltage 523 are able to provide $V_{consigne2}$ voltage which is an internal control voltage to limit the high voltage output of the comparison device 521 to the value $V_{consigne2}$ The first controller 23 further includes processing means 525 to convert the value of the input voltage $V_{RDB}$ (feedforward), a proportional-integral corrector 527 (first-order temporal filter) and a voltage limiter 529.

The processing means 525 are capable of converting the value of the input voltage $V_{RDB}$ as, for example, a linear or logarithmic law or by the use of a table in order to amplify a reduction in the value of the input voltage $V_{RDB}$. The processing means 525 amplify a reduction in the value of the input voltage $V_{RDB}$ so that a value of the input voltage $V_{RDB}$ transformed at output of processing means 525 quickly becomes a zero voltage.

For example, when the value of the input voltage $V_{RDB}$ decreases from a maximal value of 13V to a 7V value, the value of the input voltage $V_{RDB}$ is transformed and at output of processing means 525 decreases by a maximum value of 4V to an 0V value.

The processing means 525 are able to provide the value of the input voltage $V_{RDB}$ transformed to the Proportional-Integral corrector 527. The Proportional-Integral corrector 527 is able to perform temporal filtering (e.g. 10 μs) and to provide the transformed input voltage $V_{RDB}$ to the voltage limiter 524.

The voltage limiter 524 is configured to provide the transformed input voltage $V_{RDB}$ (provided by the proportional-integral corrector 527) to the selection device 27 (VREG ABAISSEUR (STEP-DOWN)=input voltage $V_{RDB}$ transformed).

The voltage limiter 524 is further configured to provide the control voltage VREG0 (supplied by the comparison device 521) to the selection device 27 (VREG ABAISSEUR (STEP-DOWN)=VREG0) if the value of the VREG0 control voltage is lower than the value of the input voltage $V_{RDB}$ transformed. Thus, the maximum output voltage $V_{HIGH}$ of the voltage limiter 524 is limited to the value of the transformed input voltage $V_{RDB}$ provided by the proportional-integral corrector 527.

For example, if VREG0 is equal to 4V and the input voltage is equal to input voltage $V_{RDB}$ transformed, then the maximum voltage of the voltage limiter is equal to 0V and VREG ABAISSEUR (STEP-DOWN) is equal to 0V. If VREG0 is equal to 4V and the transformed input voltage $V_{RDB}$ is equal to 2V, then the maximum voltage of the voltage limiter is equal to 2V and VREG ABAISSEUR (STEP-DOWN) is equal to 2V. If VREG0 is equal to 3V and the transformed input voltage $V_{RDB}$ is equal to 3V, then the maximum voltage of the voltage limiter is equal to 4V and VREG ABAISSEUR (STEP-DOWN) is equal to 3V.

Figure 20:
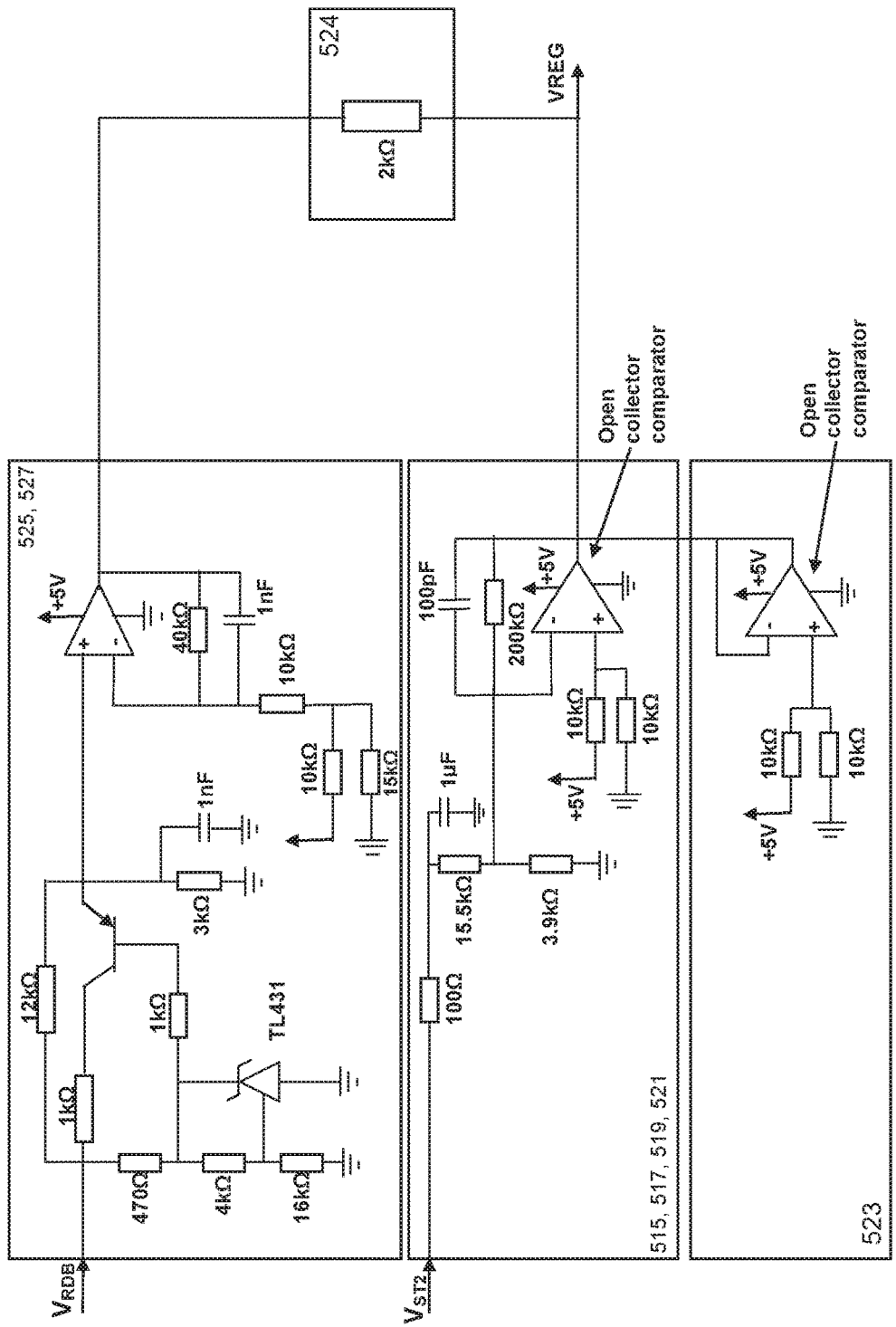
FIG. 20 shows an example of analog realization of the first controller according to the present invention.

FIG. 20 illustrates an exemplary analog implementation of the first controller 23 according to the present invention. However, a digital electronics implementation is also possible.

Figure 21:
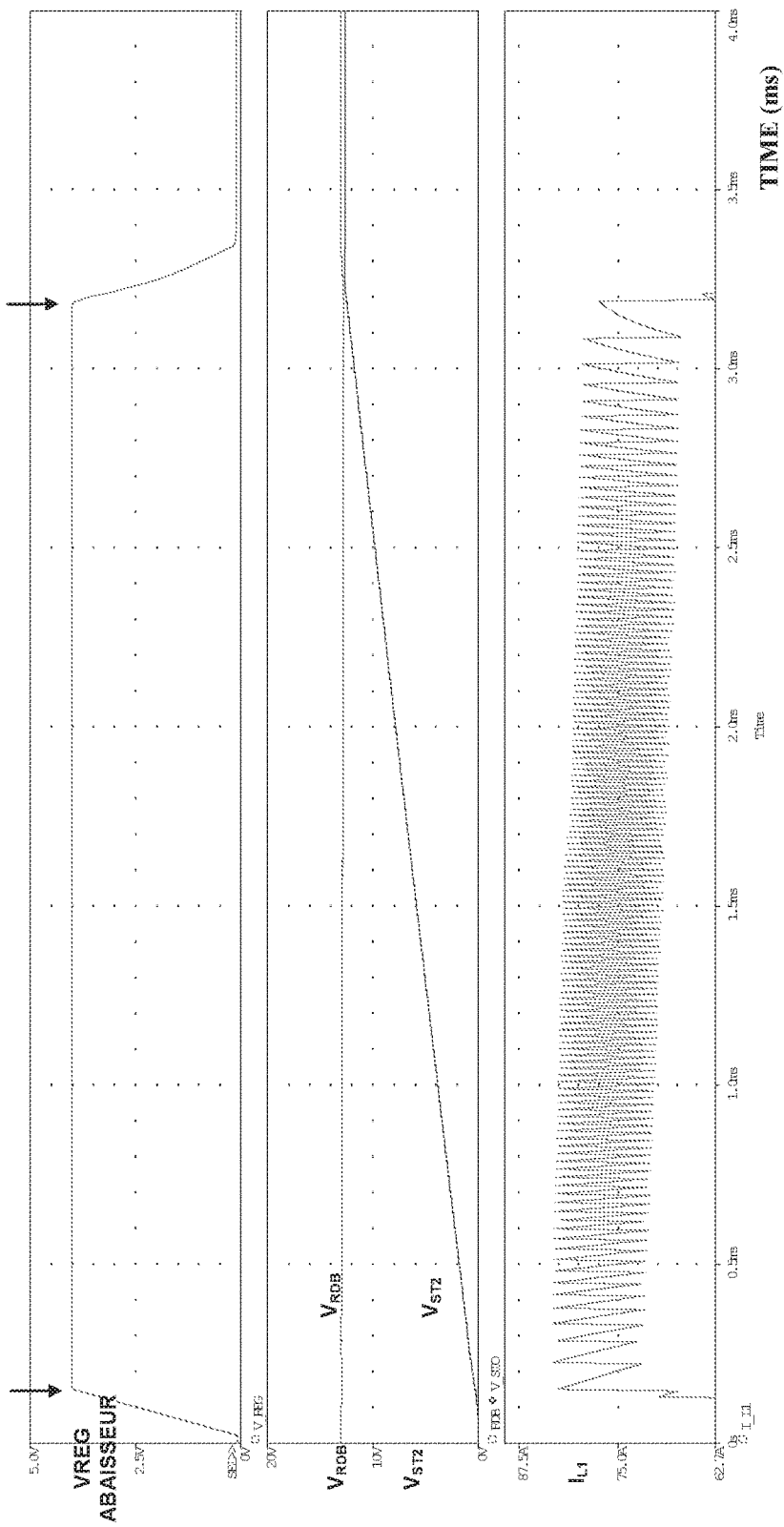
FIG. 21 shows the $I_{L1}$ current flowing through the inductance of a converter in operation in step-down voltage mode

FIG. 21 shows the current $I_{L1}$ flowing through the inductance 17A of the convertor 9A during operation of the converter in step-down voltage mode. The input voltage value $V_{RDB}$ converter is 13V and the converter increases the value of VREG STEP-DOWN to load the storage deviceST2 of a 0V value to a value of 12V. At this value of 12V, the regulator lowers VREG ABAISSEUR (STEP-DOWN) to 0V. The converter stops and $I_{L1}$ is equal to 0 A.

Figure 22:
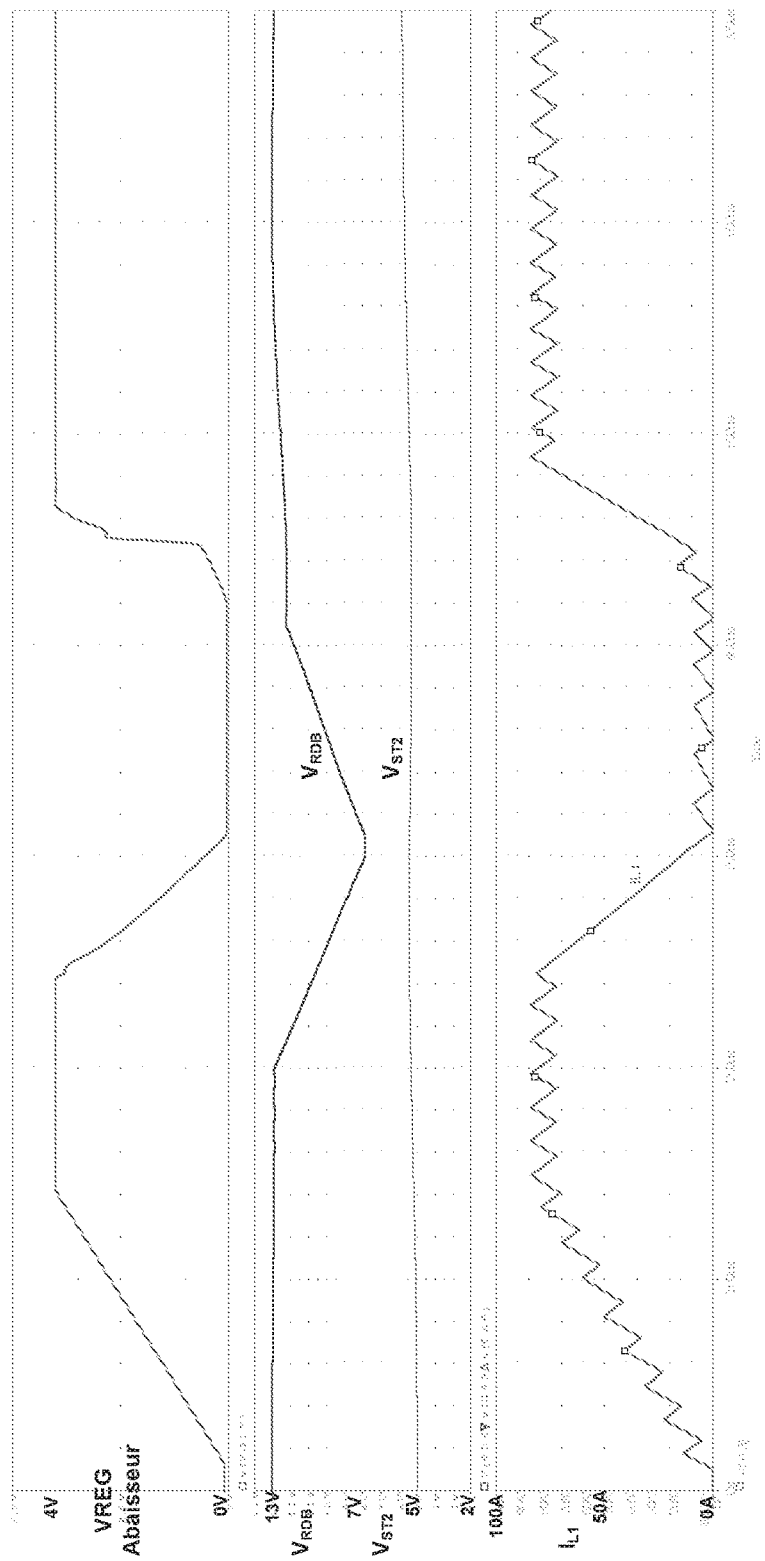
FIG. 22 illustrates the case where the value of the input voltage of the converter $V_{RDB}$ decreases.

FIG. 22 illustrates the case where the value of the input voltage of the converter $V_{RDB}$ decreases. When the value of the input voltage of the converter $V_{RDB}$ goes from 13V to 7V this fall of the $V_{RDB}$ is amplified by the first controller 23 to quickly reduce the value of VREG ABAISSEUR (STEP-DOWN) which becomes zero when $V_{RDB}$=7V.

The unit 3 of the present invention allows to quickly reduce operating converters 9A, 9B when the input voltage $V_{RDB}$ changes significantly thus avoiding unstable control and interference in a safe function of a vehicle due to the input voltage drop $V_{RDB}$ caused by the unit.

The unit 3 according to the present invention thus comprises a first controller 23 in which reference signals $V_{consigne-ST2}$ and $V_{consigne2}$ are processed, a voltage feedback signal of the output voltage and a voltage proaction signal of the input voltage. The input voltage voltage pro-action signal affects the converters regulation law and those are regulated in voltage and current. The switching frequency of the switches is not fixed because each converter is self-oscillating and controlled by the value of the peak current through the inductance 17A or 17B and by the fixed voltage hysteresis in the hysteresis comparator 213A, 213B. The converters are working at variable but low frequencies and below 40 kHz.

Figure 23:
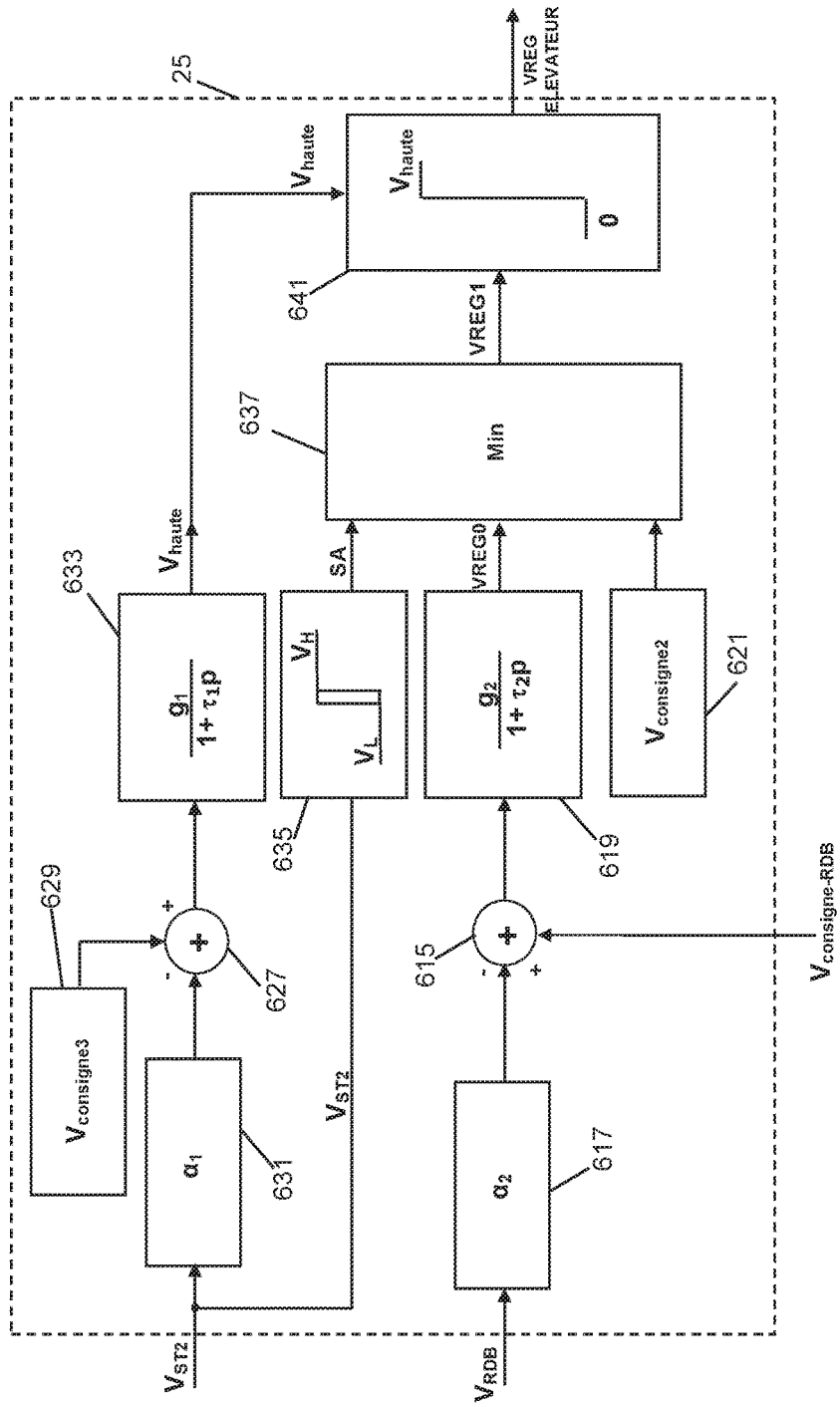
FIG. 23 shows in detail a second controller for the step-up voltage mode operation of the power unit controller according to the present invention.

The second controller 25 for the voltage step-up mode, according to another aspect of the present invention is illustrated in detail in FIG. 23.

The second controller 25 is adapted to receive an output voltage feedback signal $V_{RDB}$ of the converters (feedback), a pro-action signal in a voltage $V_{ST2}$ input voltage (feedforward) and a $V_{consigne-RDB}$ reference signal. The second regulator 25 is able to determine a control voltage value VREG ELEVATEUR (STEP-UP) from the value of the output voltage $V_{RDB}$, the value of the input voltage $V_{ST2}$ and of the value of the reference signal $V_{consigne-RDB}$. The control voltage VREG ELEVATEUR (STEP-UP) is supplied to the selection device 27 which is adapted to select the control voltage VREG ELEVATEUR (STEP-UP) when the value of the DIRECTION signal is equal to 5V (logic level 1 and step-up voltage operating mode). Then, the selection device 27 provides the control voltage VREG ELEVATEUR (STEP-UP) (control voltage VREG OUT) to the generator 13 to regulate the current flowing through the inductances 17A, 17B to the value of the regulated voltage VREG ELEVATEUR (STEP-UP).

The second controller 25 comprises a first adder 615, the first attenuating means 617, a first Proportional-Integral corrector (PI) 619, means for providing a second reference voltage $V_{consigne2}$ 621, a second adder 627, means for providing a third reference voltage $V_{consigne3}$ 629, the second means of attenuation 631, a second Proportional-Integral corrector (PI) 633, a current generation stopping device 635, a comparison device 637 and a control device 641.

The first adder 615 is able to perform a subtraction of the reference voltage $V_{consigne-RDB}$ to a fraction of the output voltage $V_{RDB}$ (feedback) provided by the first attenuating means 617. The error output from the first adder 615 is corrected by the first Proportional-Integral corrector (PI) 619 and the result represented by a value of a voltage regulation VREG0 is supplied to the comparison unit 637. The first Proportional-Integral corrector (PI) is 619, for example, a first order filter with a g2 gain.

The first current generation stopping device 635 is adapted to receive the voltage pro-action signal $V_{ST2}$ the input voltage and generating an SA current generation stop signal in the inductances when the value of the voltage pro-action signal reaches a predetermined non-zero value. The current generation stopping device 635 is adapted to compare the value of the input voltage $V_{ST2}$ to a predetermined internally fixed value VL (for example, 4V). The current generation stopping device 635 is configured to provide a zero voltage 0V (stop signal of SA current generation in the inductances) to the comparison device 637 when the value of the $V_{ST2}$ input voltage is equal or below this predetermined VL value. The current generation stopping device 635 does not provide a signal to the comparison device 637 when the value of the input voltage $V_{ST2}$ is greater than the predetermined value VL.

The comparison device 637 is adapted to receive and compare the SA current generation stop signal, the voltage (VREG0) issued of the first Proportional-Integral corrector (PI) 619 and the reference voltage $V_{consigne2}$ provided by the means for providing a second reference voltage 621, to copy at the output the minimum value of the three voltages and to supply this voltage to the controller 641 as VREG1 control voltage. The value of the control voltage VREG1 is 0V when the SA of the current generation stop signal is received by the comparison unit 637.

The means for providing a second reference voltage 621 are adapted to provide a $V_{consigne2}$ voltage which is an internal control voltage to limit the high voltage output of the comparison device 637 to this $V_{consigne2}$ reference value (for example, 4V).

The second controller 25 comprises means for processing the input voltage value $V_{ST2}$ suitable for transforming a decrease in the value of the $V_{ST2}$ input voltage into an increasing control voltage $V_{high}$. The second adder 627 is able to perform a subtraction of the third reference voltage $V_{consigne3}$ to a fraction of the input voltage $V_{ST2}$ (feedforward) supplied by the second attenuating means 631. The output result of the second adder 627 is processed by the second Proportional-Integral corrector (PI) 633 and the processed signal $V_{high}$ is supplied to the control unit 641.

The means for providing a third reference voltage 629 are able to provide a $V_{consigne3}$ voltage which is an internal control voltage (e.g., 2V).

The second Proportional-Integral corrector (PI) 633 is, for example, a first order filter with a gain g1. The second Proportional-Integral corrector (PI) 633 is able to transform the output result of the second adder 627 according to a decreasing linear law to provide a $V_{HIGH}$ processed signal (and a control voltage VREG ELEVATEUR (STEP-UP)) which decreases when the value of the output result of the second adder 627 (and the value of the input voltage $V_{ST2}$) increases. The second Proportional-Integral corrector (PI) 633 is thus able to provide the control device 641 a $V_{HIGH}$ processed signal which linearly increases when the value of the input voltage $V_{ST2}$ decreases.

Figure 24:
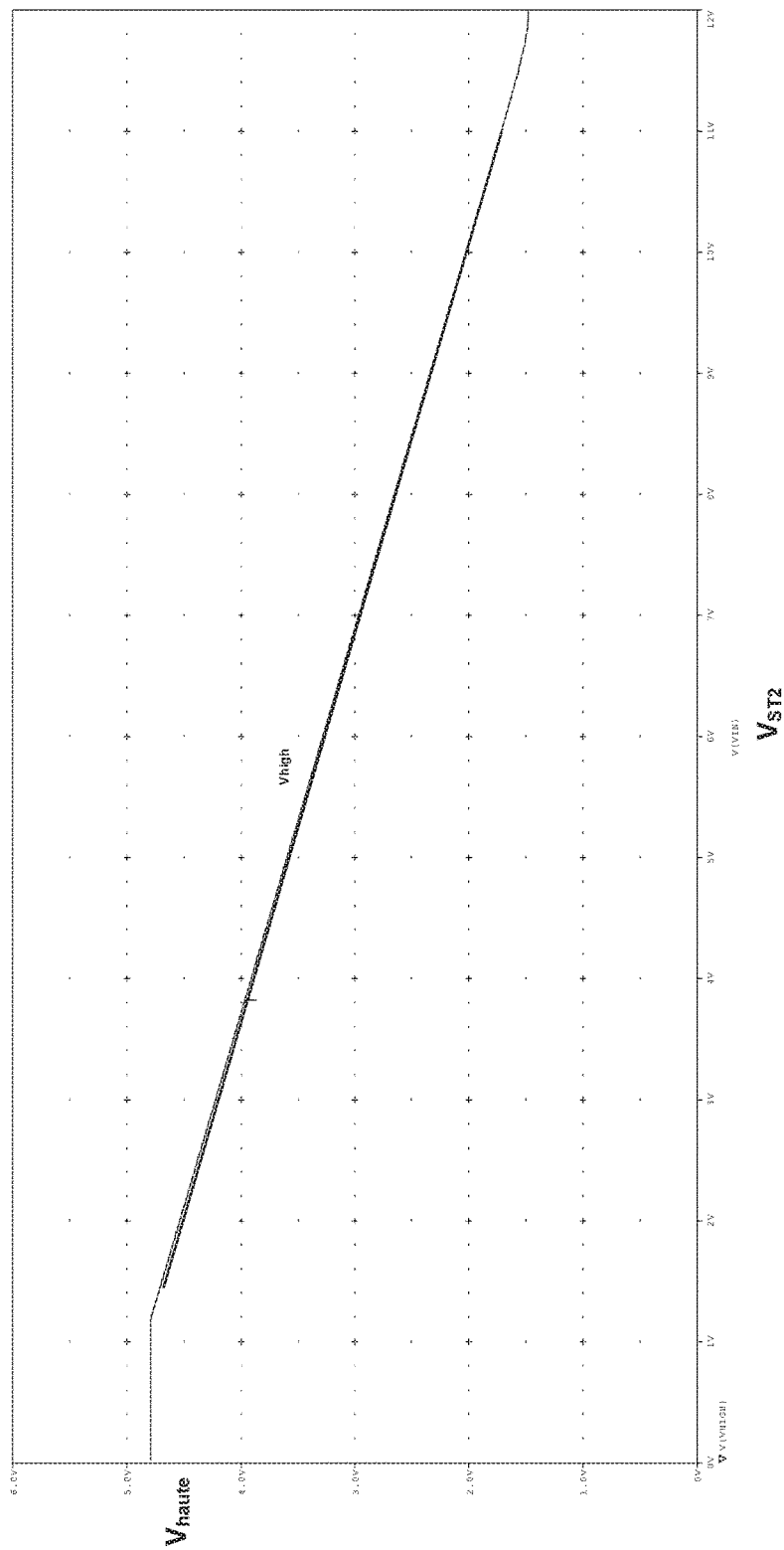
FIG. 24 shows an example of a transfer function of the second Proportional-Integral corrector (PI) of the second controller.

FIG. 24 illustrates an example of a transfer function of the second Proportional-Integral corrector (PI) 633.

The control unit 641 is configured to provide the $V_{HIGH}$ processed signal (provided by the second Proportional-Integral corrector 633) to the selecting device 27 (VREG ELEVATEUR (STEP-UP)=$V_{high}$).

The controller 641 is further configured to provide the control voltage VREG1 (by the comparison device 637) to the selecting unit 27 (VREG=ELEVATEUR (STEP-UP)= VREG1) if the value of the control voltage VREG1 is less the value of the $V_{HIGH}$ processed signal.

Thus, the maximum voltage output of the control unit 641 is limited to the value of the $V_{HIGH}$ processed signal provided by the second Proportional-Integral corrector 633. When the SA current generation stop signal in the inductances 17A, 17B (0V) is received by the controller 641, via the comparison means 637, the controller 641 provides a control voltage VREG of 0V to the selection device 27 to stop the generation of the current through inductances 17A, 17B.

Figure 25:
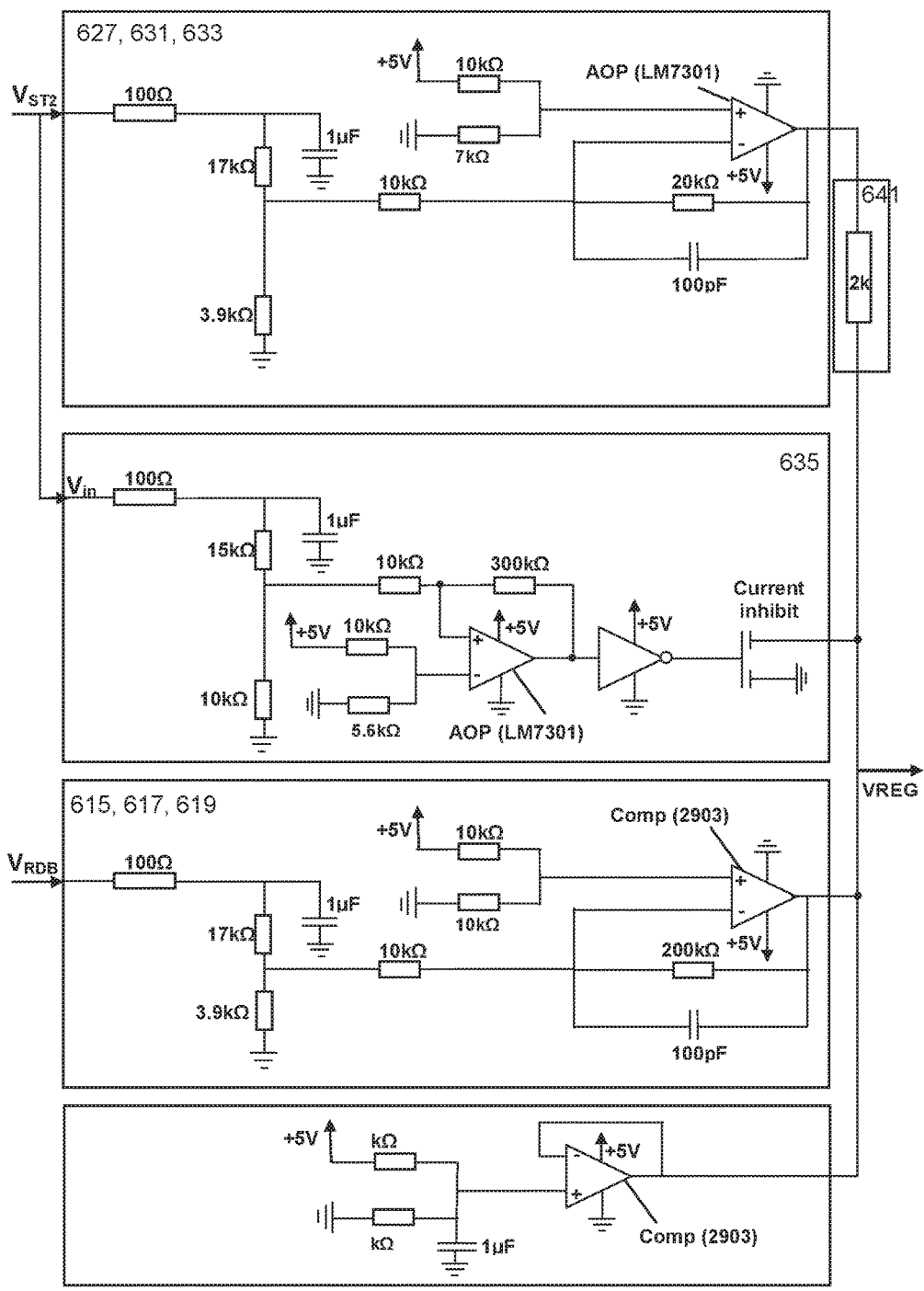
FIG. 25 illustrates an analog application of the second controller 25 according to the present invention.

FIG. 25 illustrates an analog realization of the second controller 25 according to the present invention. However, a digital electronics implementation is also possible.

Figure 26:
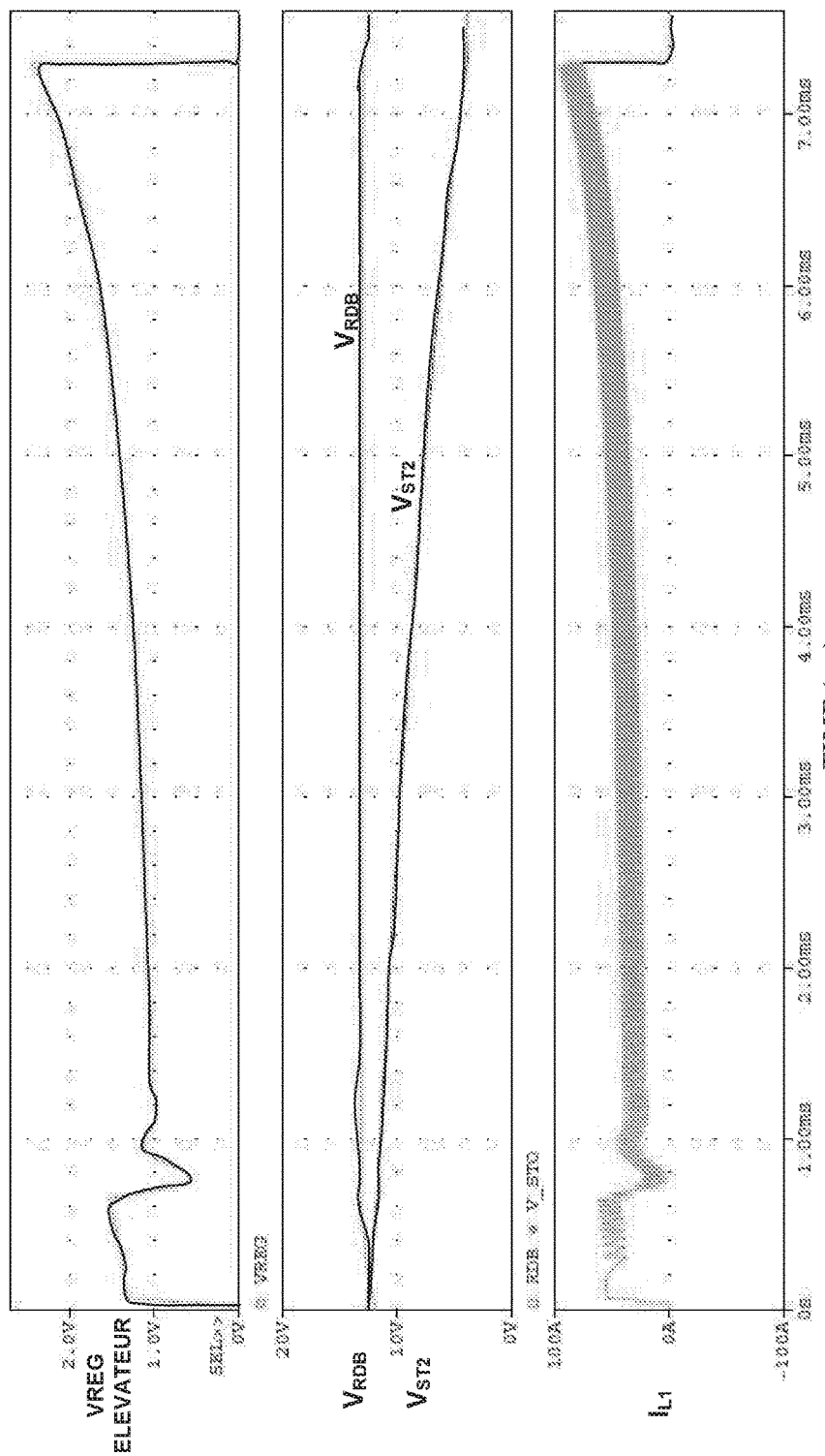
FIG. 26 shows the current $I_{L1}$ going through the inductance of a step-up voltage mode converter when the input voltage decreases.

FIG. 26 illustrates the current $I_{L1}$ flowing through the inductance 17A of the converter 9A when the input voltage $V_{ST2}$ decreases. The input voltage value of the convertor $V_{ST2}$ decreases of a value worth 12.5V to 4V. During the reduction of the value of $V_{ST2}$, converter 9A increases the current $I_{L1}$ flowing through the inductance 17A (and the value of VREG ELEVATEUR (STEP-UP)) to stabilize the output voltage $V_{RDB}$ to 13V. When the value of the input voltage $V_{ST2}$ reaches 4V, the current generation stopping device 635 generates a current generation stop signal 17A in the inductance and the second controller 25 sets the value of VREG ELEVATEUR (STEP-UP) to 0V. The converter stops and $I_{L1}$ is equal to 0 A.

The converters of the unit 3 of the present invention change the $V_{RDB}$ output voltage and output power in a linear manner when the value of the input voltage $V_{ST2}$ decreases and to maintain an output voltage $V_{RDB}$ greater than or equal to a predetermined value (e.g., 12V). It allows in this way to provide an output voltage $V_{RDB}$ substantially constant. The unit 3 allows moreover stopping the current generation through the inductances 17A, 17B before the value of the input voltage $V_{ST2}$ reaches a value where the operation of the converter becomes unstable and their performance becomes severely degraded.

The unit 3 according to the present invention comprises a second regulator 25 in which the reference signals $V_{consigne\text{-}RDB}$ $V_{consigne25}$ and $V_{consigne3}$, a voltage feedback signal from the output voltage, and a pro-action signal voltage of the input voltage. The voltage pro-action signal of the input voltage affects the converters regulation law, and converters are then regulated in voltage and current. The switching frequency of the switches is not fixed because the converters are self-oscillating and controlled by the value of the peak current through the inductances 17A, 17B and the fixed voltage hysteresis in the hysteresis comparators 213A, 213B. The variable frequency converters are working at variable but low frequency and in any case below 40 kHz.

Figure 27:
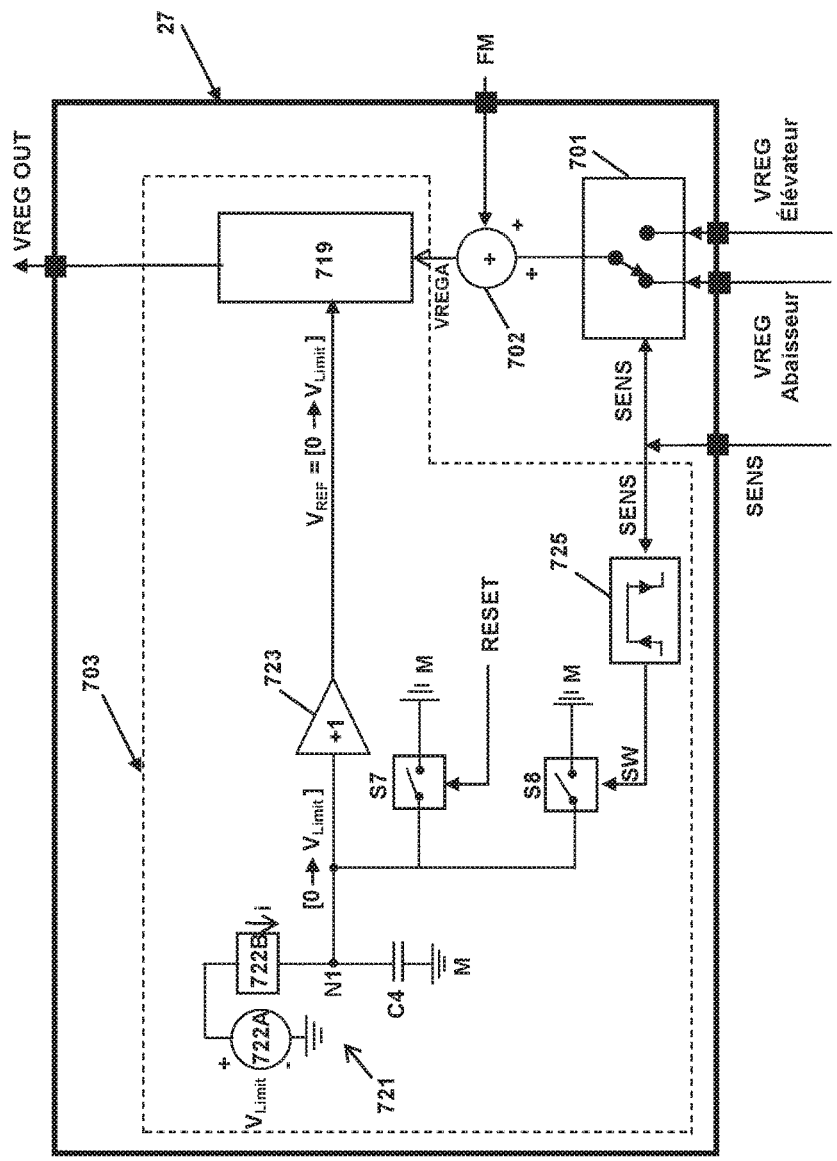
FIG. 27 shows a selection device of the controller of the supply unit in electrical energy according to the present invention.

The selection device 27, according to another aspect of the present invention is illustrated in detail in FIG. 27.

The selection device 27 adapted to receive the control voltage VREG ELEVATEUR (STEP-UP) supplied by the first controller 23, the control voltage VREG ABAISSEUR (STEP-DOWN) supplied by the second regulator 25, the DIRECTION signal and the alternating FM voltage signal having a predetermined frequency and supplied by the modulator 15. The selection device 27 is further adapted to provide the control voltage VREG ABAISSEUR (STEP-DOWN) or control voltage VREG ELEVATEUR (control voltage VREG OUT) to the generator 13.

The selection device 27 includes a switch 701, an adder 702 and a protective device 703.

The switch 701 is adapted to receive the DIRECTION signal, the control voltage VREG ABAISSEUR (STEP-DOWN) and the control voltage VREG ELEVATEUR (STEP-UP). It is adapted to select the control voltage VREG ELEVATEUR (STEP-UP) when the value of the DIRECTION signal is equal to 5V (logical level 1 level and step-up operation voltage mode) and provide the control voltage VREG ELEVATEUR (STEP-UP) to the adder 702. The switch 701 is also capable of selecting the control voltage VREG ABAISSEUR (STEP-DOWN) when the value of the DIRECTION signal is equal to 0V (logic level 0 and step-down operation mode) and provide the regulation voltage VREG ABAISSEUR (STEP-DOWN) to the adder 702.

The adder 702, according to another aspect of the present invention is adapted to perform an addition of the FM alternating voltage signal having a predetermined frequency to the control voltage VREG ELEVATEUR (STEP-UP) or control voltage VREG ABAISSEUR (STEP-DOWN). The result, representing a value of a control voltage modulated by the FM signal, is provided to the protective device 703.

The FM signal generated by the modulator 15 may be an AC signal from a conventional generator such as a square or triangle sine wave generator, or from a table. The amplitude of the signal is weak vis-a-vis that of VREG ELEVATEUR (STEP-UP) or VREG ABAISSEUR (STEP-DOWN), for example, 100 to 300 mV, and the frequency of the FM signal is a low frequency, for example, a 100 Hz to 1 kHz. The adder 702 allows modulation of the control voltage VREG OUT allowing alternately varying the reference current $I_{L1}$ and $I_{L2}$ in this modulation frequency imposed by the FM signal. The frequency of the duty cycle 1 and of the duty cycle 2 is then modulated by the low frequency modulator 15. The modulator 15 (as well as the selection device 27 and the generator 13) makes it possible to generate duty cycles (HS-1 LS-1, HS-2, LS-2) at variable frequency and with a large broadband. The conducted and radiated emissions are presented on a broader spectrum in radio frequency so that compliance with requirements is easier to achieve.

As illustrated in FIG. 27, the protection device 703 includes a voltage limiter 719 to provide the generator voltage regulation 13 VREG OUT.

The protection device 703 according to another aspect of the present invention is able to limit a change in the value generating a current flowing through the converters for a predetermined duration when a change of direction of operation is detected in order to assure the thermal protection of the converters. It is further adapted to detect a feeding process of the converters and to limit a change in the value generating a current flowing through the converters for a predetermined duration when the feeding process is detected The protection device 703 further comprises a generator 721 electrically connected to a capacitor C4 through the intermediary of a node N1, and switches S7 and S8. The generator 721 includes a voltage source 722A and 722B and a power generator. Each switch S7, S8 is electrically connected on one side to node N1 (between the generator 721 and capacitor C4) and on the other side to the grounding device M. The voltage limiter 719 is connected electrically to node N1 by assistance of an amplifier 723.

The voltage limiter 719 is also capable of receiving the result (control voltage VREGA) of (addition of AC voltage signal FM voltage VREG LIFT regulation or voltage VREG regulation made by BUCK the adder 702.

The switch S7 is capable of receiving the RESET signal at a power setting of the unit 3 and close the switch S7 when the signal is received. A 725 device is capable of receiving the DIRECTION signal when changing the step-down voltage mode to the step-up voltage mode (or vice versa), and detect a rising or falling edge of the DIRECTION signal to close the switch S8 (through an SW signal).

In one application of the present invention, the converter 1 includes means to detect a reverse current flowing in inductances inductance 17A, 17B and close the reversing switch S8 when the current is detected.

The generator 721 loads in current capacitor C4. The voltage at the terminals of C4 is equal to 0 if the switch S7 is closed, that is to say, during a time to RESET (alarm of the internal power supplies) or if the switch S8 is closed, that is to say, each positive transition and negative DIRECTION signal detected by the unit 725.

Next, the voltage across C4 rises, for example, linearly (or other function) until the limit of $V_{Limit}$ (e.g. +4V) during a transition time established by the values of the capacity of the C4 and the current i supplied by the power generator 722B, for example 0.2 minutes.

This voltage is copied by the amplifier 723 with a gain of 1 and provided as a reference voltage $V_{REF}$ to the voltage limiter 719.

The voltage limiter 719 is configured to provide this voltage reference amount 0V until the limit value $V_{Limit}$ of the generator 13 (VREG OUT 0 at the $V_{Limit}$).

Thus, the maximum voltage of the voltage limiter 719 can take the following values:
 0V during a power-up;
 0 to 4V after a mode change during the transition time (e.g. 0.2 mn); and $V_{Limit}$=4V permanent if a RESET or DIRECTION signal is not received.

The voltage limiter 719 is further configured to provide the regulation voltage VREGA supplied by the adder 702 to the generator 13 (VREG=VREGA OUT) if the value of the VREGA regulation voltage is lower than the value of the reference voltage VREF.

For example, if VREGA is equal to 4V and the reference voltage VREF is equal to 0V, then the maximum voltage of the voltage limiter is equal to 0V and VREG OUT is equal to 0V. If VREGA is equal to 4V and the reference voltage VREF is equal to 2V, then the maximum voltage of the voltage limiter is equal to 2V and VREG OUT is equal to 2V. If VREGA is equal to 3V and the reference voltage VREF is equal to 4V, then the maximum voltage of the voltage limiter is equal to 4V and VREG OUT is equal to 3V.

Figure 28:
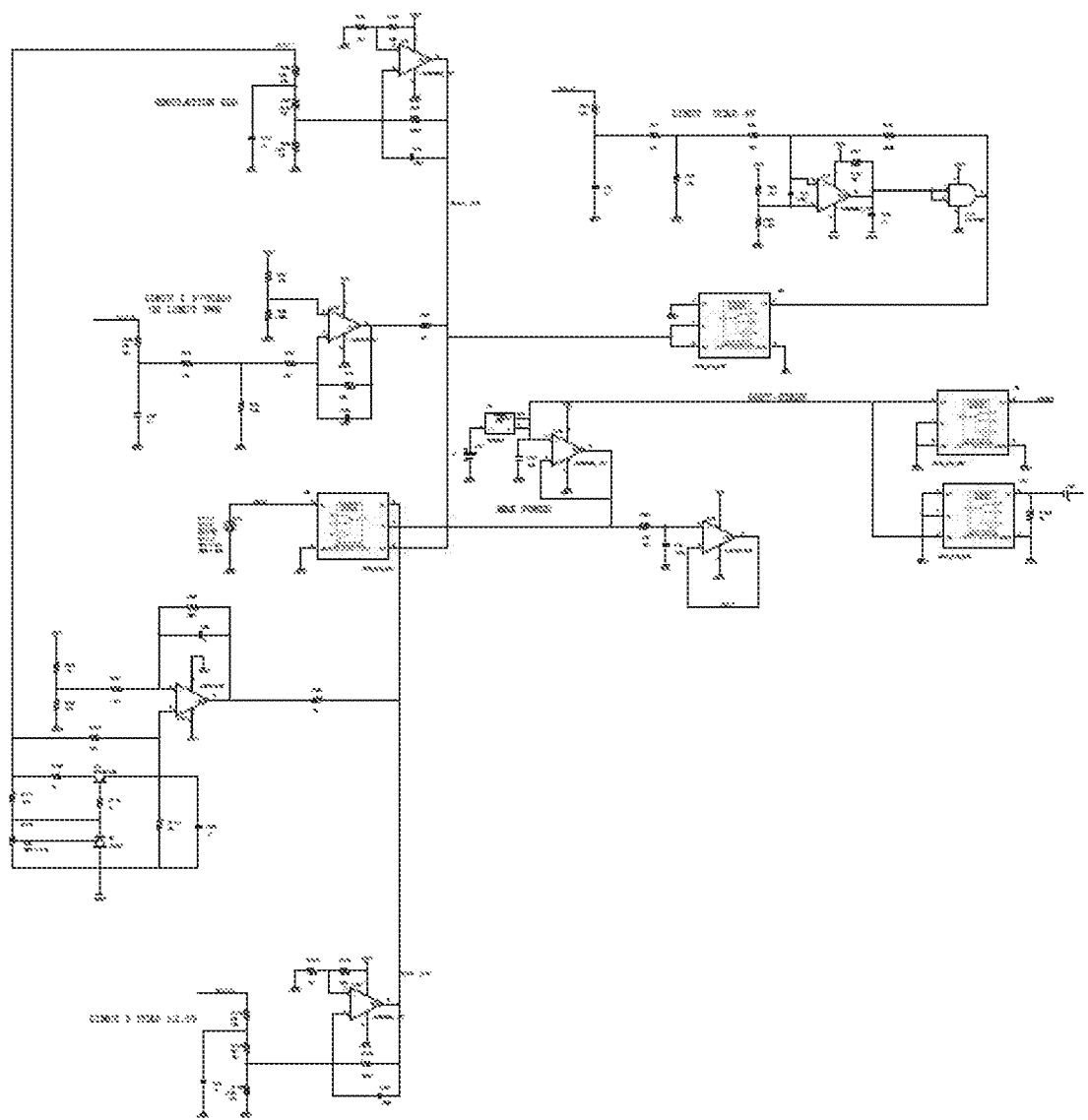
FIG. 28 illustrates an exemplary application of the controller according to the present invention.
Figure 29:
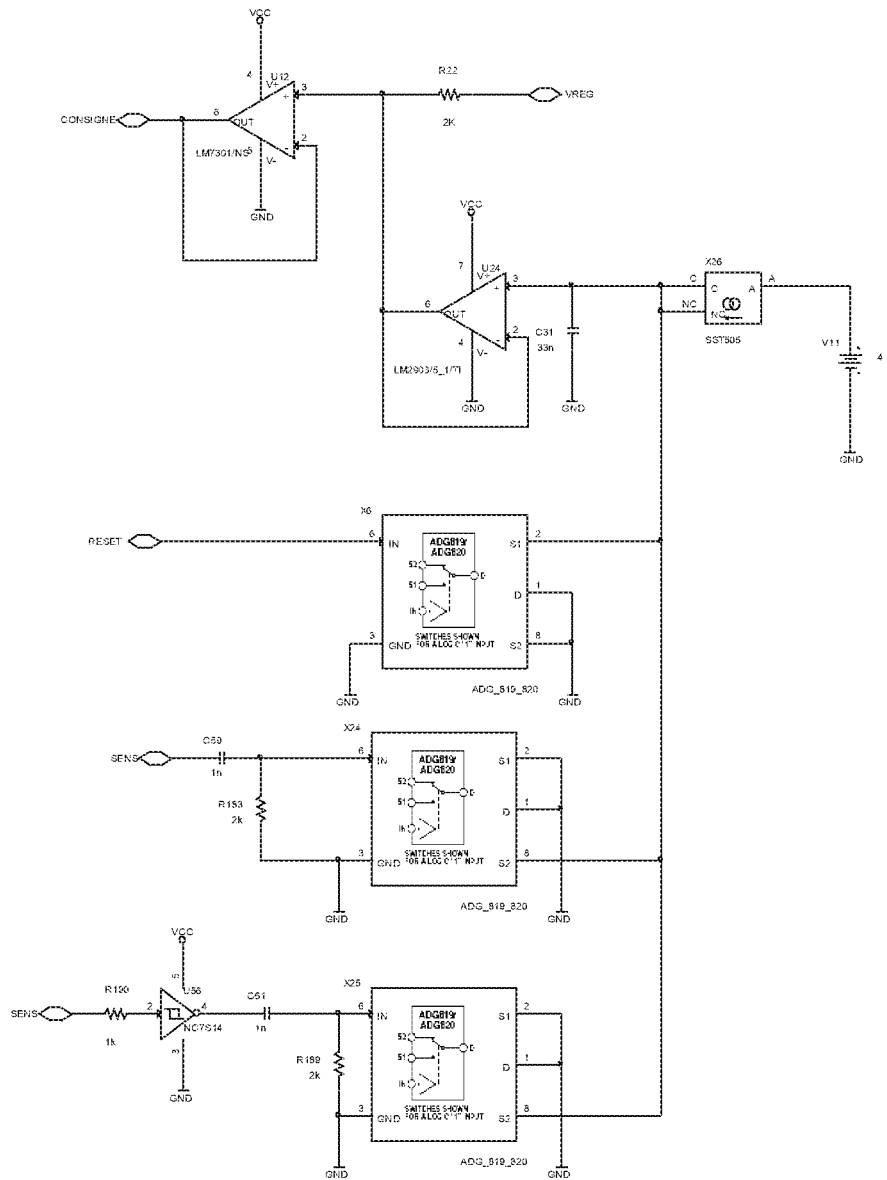
FIG. 29 shows a realization of the protective device according to the present invention.

FIG. 28 illustrates an exemplary application of the controller according to the present invention. FIG. 29 illustrates an application of the protective device 703 according to the present invention.

Figure 30:
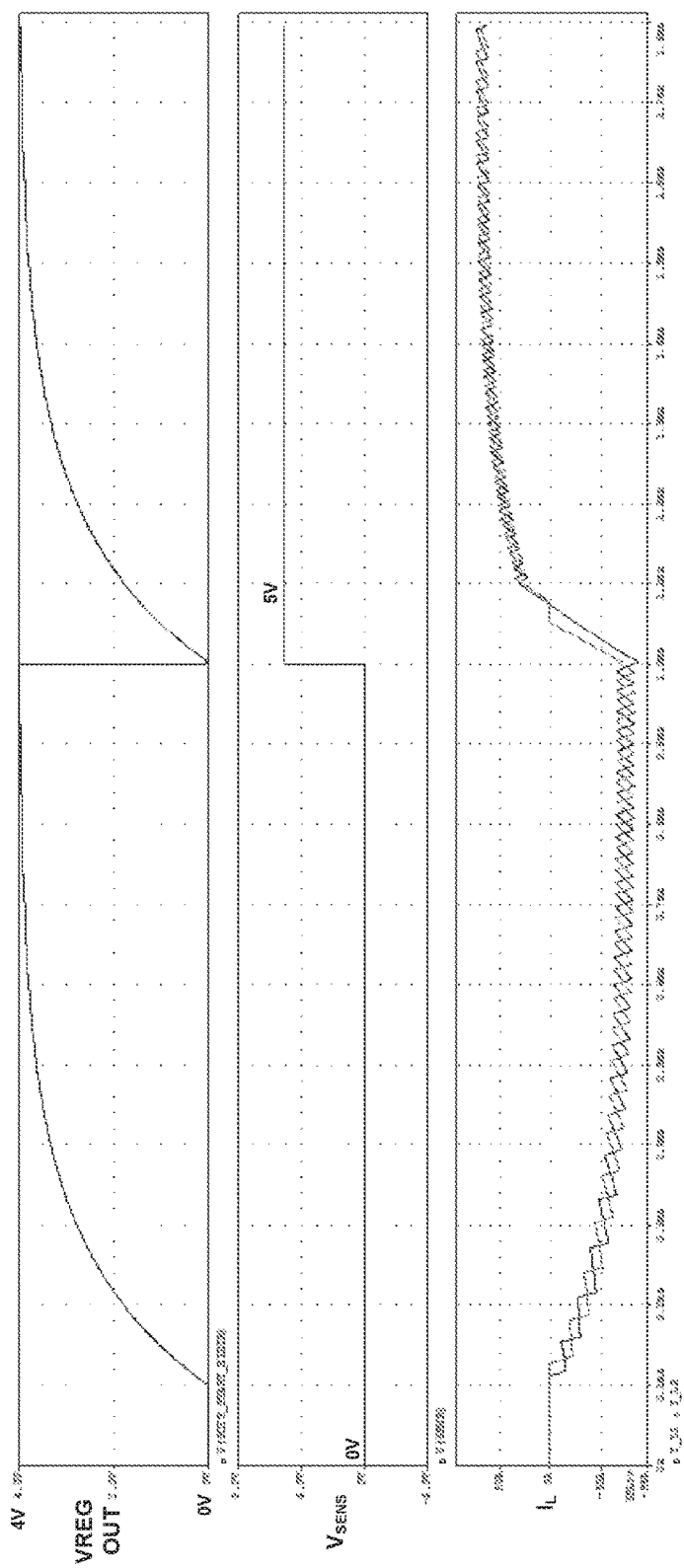
FIG. 30 shows the evolution of the current flowing through the inductances following a change of operating mode of the converters.

FIG. 30 illustrates the evolution of the current through the inductances following a change of converter operation. When the DIRECTION signal changes from 0V to 5V signaling a change in the mode of operation, the VREG OUT voltage regulation is limited by the voltage limiter 719 and takes the value of 0V. VREG OUT regulating voltage gradually increases from this value of 0V to $V_{Limit}$ (for example, 4V) for a predetermined time. The direction of flow of the current IL is reversed but the value of current IL does not increase abruptly and increases depending on the value of the voltage VREG1 regulation.

This prevents an abrupt temperature rise in the electronic components of each converter and the transient power loss of the switches is limited to a predefined value, this value being determined by the generator 721 and the capacitor C4.

The continuous power dissipation is limited by the value of $V_{Limit}$ and gradient transient junction temperature is limited to a predefined value compatible with and reliability targets and sustainability of semiconductor converters components.

Figure 31:
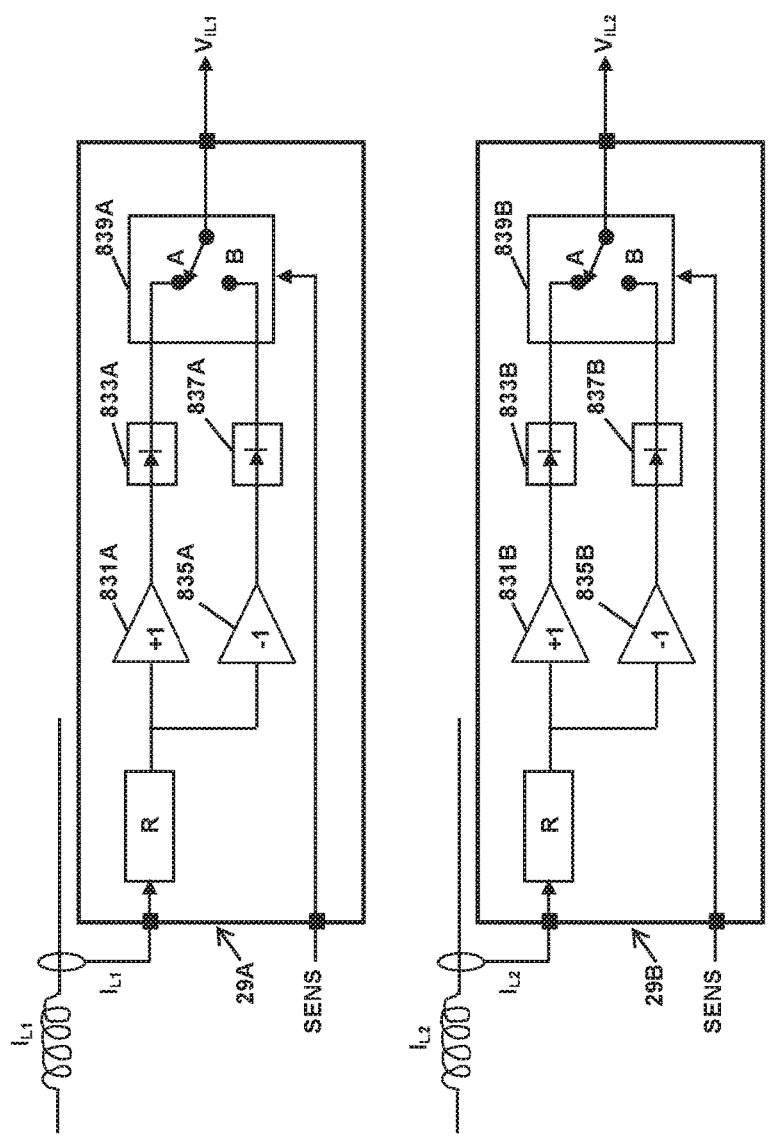
FIG. 31 illustrates means for providing respectively a $V_{L1}$ voltage and a $V_{L2}$ voltage representative of the current $I_{L1}$ and $I_{L2}$ flowing through the inductances.

The means 29A, 29B respectively allow to provide a voltage $V_{L1}$ and a voltage $V_{L2}$ (an image of the current $I_{L1}$ and $I_{L2}$) representative of the current $I_{L1}$ and $I_{L2}$ respectively through the inductance 17A and inductance 17B as illustrated in FIG. 31.

The means 29A and 29B are identical and configured to determine an absolute value of a voltage VL.

The 29A converter means comprises a linear current/voltage gain A, an amplifier 831 of gain 1, a tracking peak detector 833A, a −1 amplifier gain 835A, a peak detector 837A and a switch 839A.

The 29A converter means comprises the linear current/R voltage gain in order to convert a sampling of the current $I_{L1}$ flowing through the inductance 17A in a $V_{L1}$ voltage. An image of the current $I_{L1}$ is thus produced. We have at output of the linear converter current/voltage gain R a voltage equal to $V=R \times I_{L1}$.

However, this voltage is positive or negative depending on the direction of operation of the converters (step-down or step-up voltage).

A positive voltage is processed by the +1 gain amplifier 831A and the peak detector 833A. A negative voltage is processed the −1 amplifier 835A and the peak detector 837A. The switch 839A is capable of receiving the DIRECTION signal and a position A or B of the switch 839A is changed for each positive and negative transition of the DIRECTION signal detected by the switch 839A.

Taking for example R=0.060 ohm, $I_{L1}$=50 A and DIRECTION=1 then V at the output of the tracking peak detector 833A=0.06×50×1×1=3.0V, at the output of the tracking peak detector 837A=(0.06×50)×0×−1=0V and then the output of the switch 839A=the output voltage of the tracking peak detector 833A=3.0V.

Taking for example R=0.060 ohm, and $I_{L1}$=−50 A DIRECTION=0, then V at the output of the tracking peak detector 833A=0.06×−50×0=0V, in output of the tracking peak detector 837A=(0.06×−50)×−1×1=3.0V and then the output of the switch 839A=voltage output of the tracking peak detector 837A=3.0V.

In a change of direction of operation of the converters (lower voltage to voltage step-up), the $I_{L1}$ and $I_{L2}$ decrease towards 0 A and change value and then increase to wait for their set values. 29A and 29B means make it possible to obtain at the output of the switch 839A the positive value or null value of the $V_{L1}$ voltage of the representative of the current $I_{L1}$ across the inductance 17A and at the output of the switch 839B the positive or null value of the $V_{L2}$ voltage of the representative current $I_{L2}$ through the inductance 17B.

Figure 32:
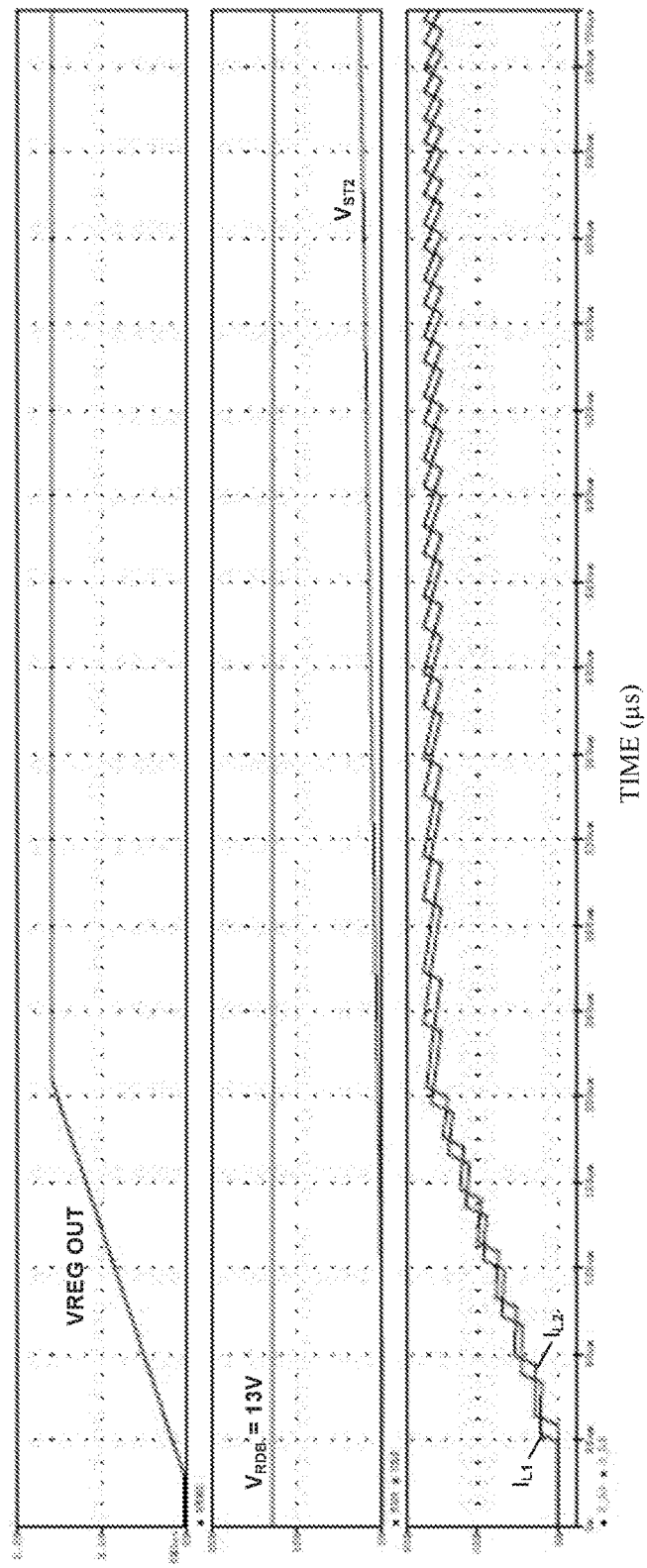
FIG. 32 illustrates the operation of the system shown in FIG. 1 when starting converters are operating in step-down voltage mode.

FIG. 32 illustrates the operation of the system shown in FIG. 1 when starting converters operating in step-down mode. VREG OUT voltage rises from a 0V value to a 4V value 200 µs. The value of the VRDB voltage is 13V and the energy storage device ST2 will charge from a0V value to a 12V value. The currents $I_{L1}$ and $I_{L2}$ rise from a 0 A value to a 75 A value dependent on the reference voltage VREG OUT.

Figure 33:
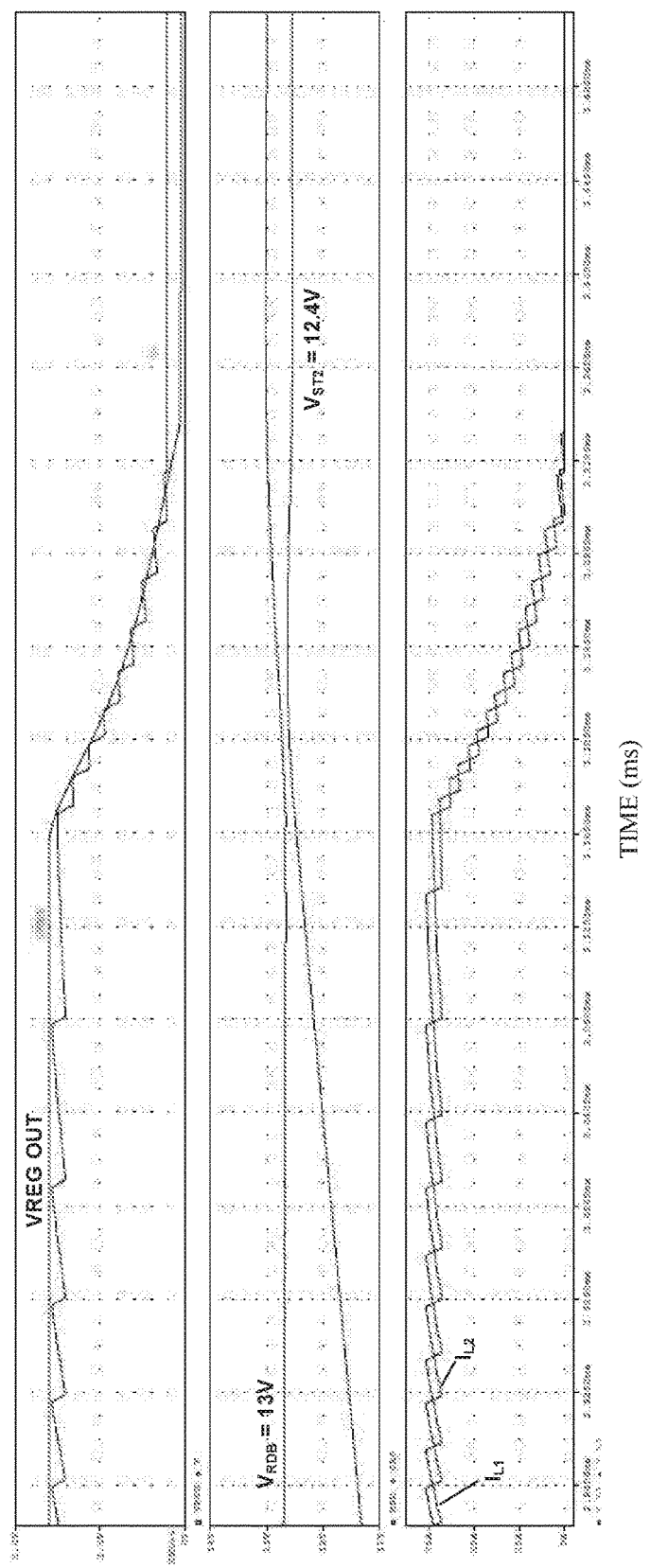
FIG. 33 illustrates the operation of the system shown in FIG. 1 when stopping converters are operating in step-down voltage mode.

FIG. 33 illustrates the operation of the system shown in FIG. 1 when stopping converters operating in step-down mode. VREG OUT voltage decreases from a 4V value to a value of 0V due to the end of charging the energy storage device ST2 and the voltage applied by the stopping devices DA1, DA2. The value of the VRDB voltage is 13V and the energy storage device ST2 is charged to a 12.4V value. The $I_{L1}$ and $I_{L2}$ current decrease of a value of 75 A to 0 A value in accordance with the reference voltage VREG OUT.

Figure 34:
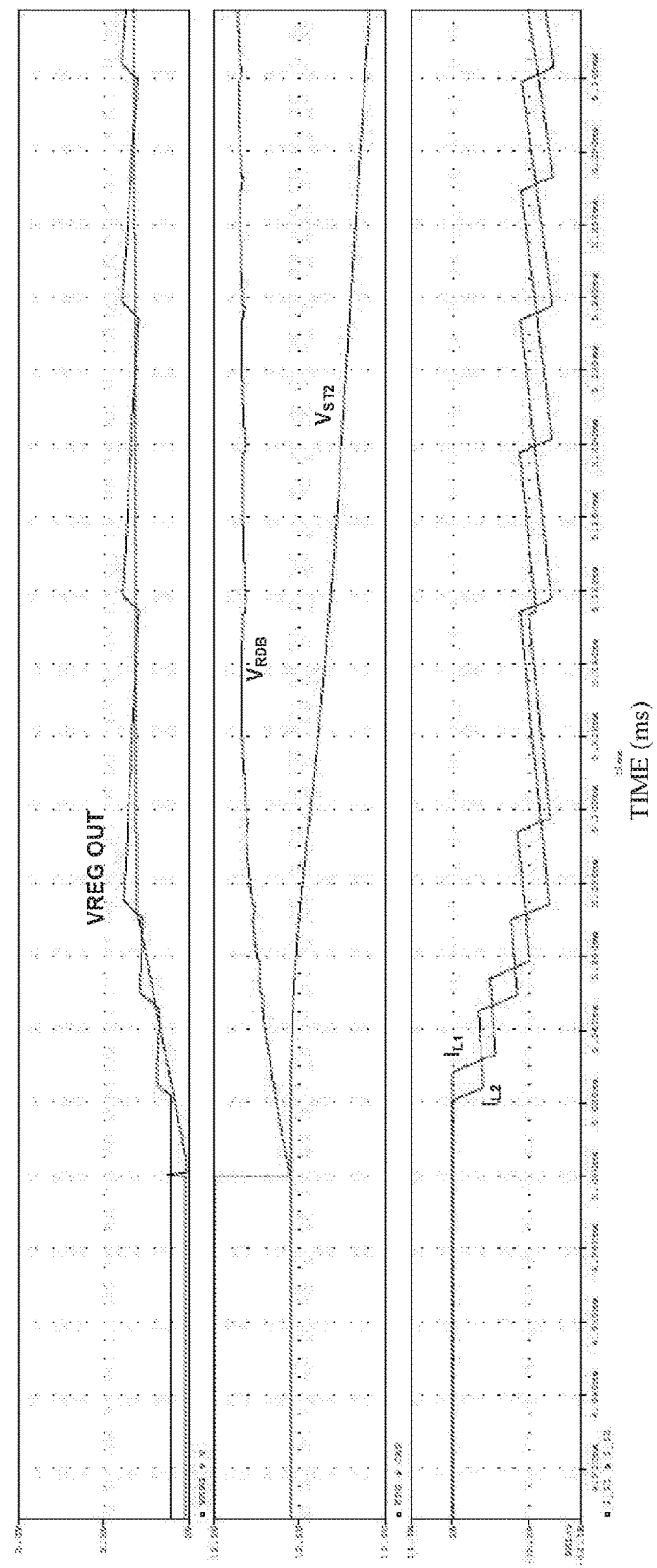
FIG. 34 illustrates the operation of the system shown in FIG. 1 when starting converters are operating in step-up voltage mode.

FIG. 34 illustrates the operation of the system shown in FIG. 1 when starting converters operating in voltage STEP-UP mode. VREG OUT voltage rises from a 0V value to a 1.5V value. The value of the VRDB voltage is 13V and the energy storage device ST2 experiences a discharge from a 12.4V to a 4V value.

Figure 35:
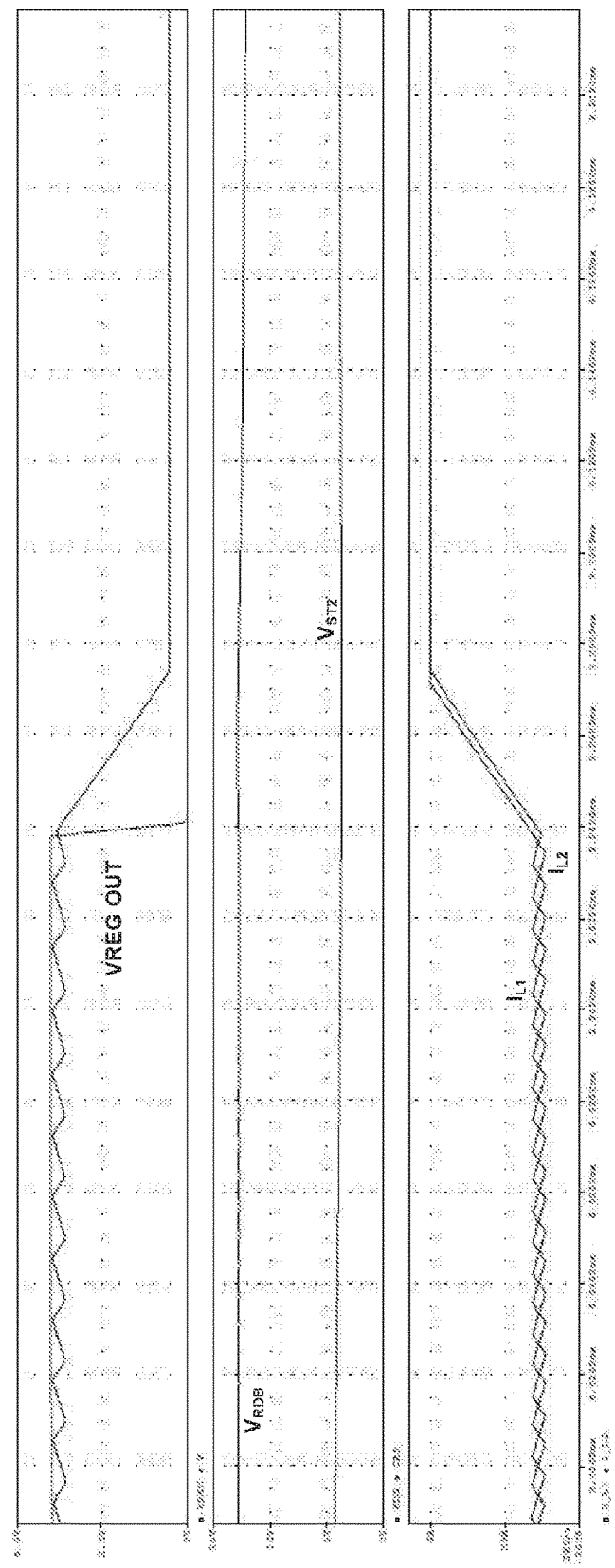
FIG. 35 illustrates the operation of the system shown in FIG. 1 when stopping converters are operating in step-up voltage mode.

FIG. 35 illustrates the operation of the system shown in FIG. 1 when stopping converters operating in voltage step-up mode. VREG OUT voltage decreases from a 4V value to a value of 0V due to the end of discharge of the energy storage device ST2 and the voltage applied by the stopping devices DA1, DA2. The value of the VRDB voltage is 13V and the energy storage device ST2 ends its discharge at a 4V value. The $I_{L1}$ and $I_{L2}$ currents decrease in value from −75 A to a 0 A value based on the reference voltage VREG OUT.

Figure 36:
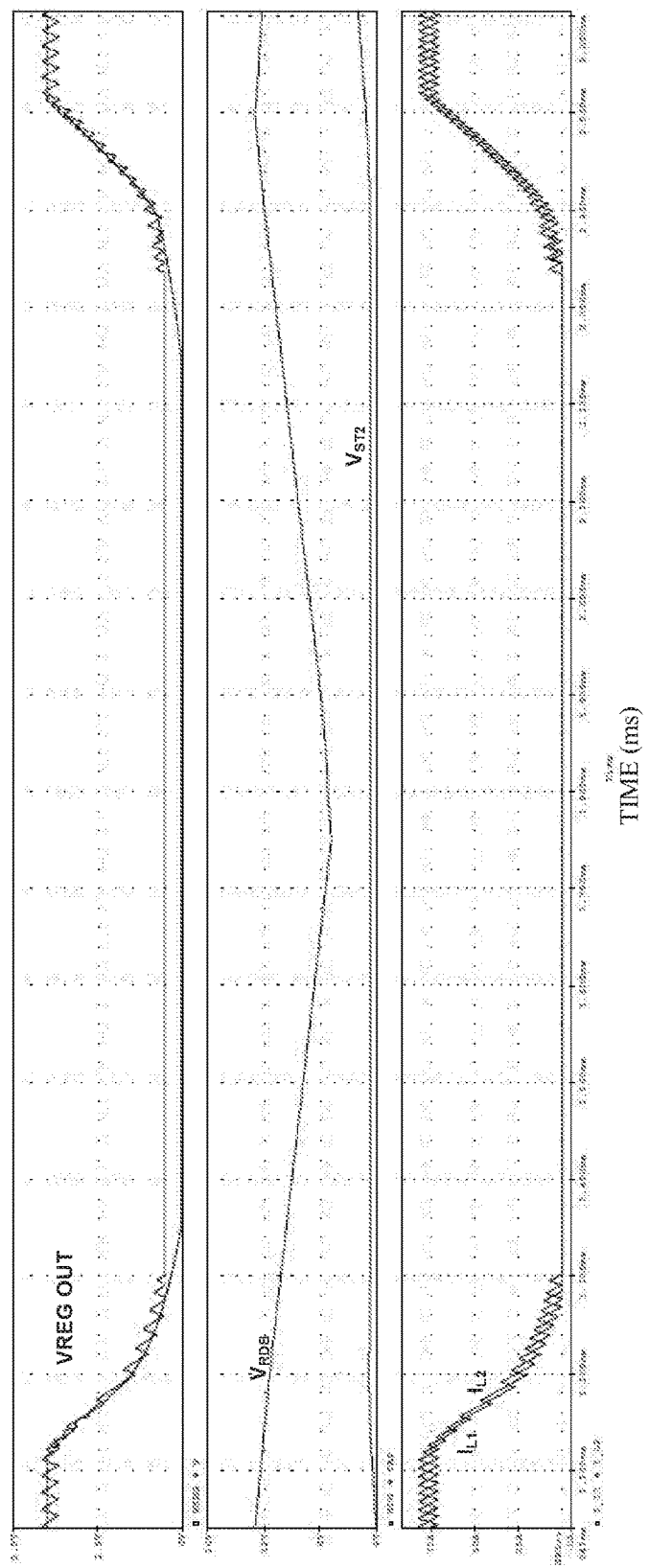
FIG. 36 shows the effect of the pro-action signal during operation of the system shown in FIG. 1 when such converters operate in step-down voltage mode.

FIG. 36 illustrates the effect of pro-action signal when powered during operation of the system shown in FIG. 1 when such converters operate in voltage step-down mode (charging of the energy storage device ST2). The voltage $V_{RDB}$ drops from a value of 13V to a value of 7V and then increases back to a 13V value. VREG OUT voltage decreases from a 4V value to a 0V value because of the effect of pro-action voltage signal and the voltage applied by the stopping devices DA1, DA2. The $I_{L1}$ and $I_{L2}$ currents decrease of 75 A towards a 0 A value depending on the reference voltage VREG OUT.

Figure 37:
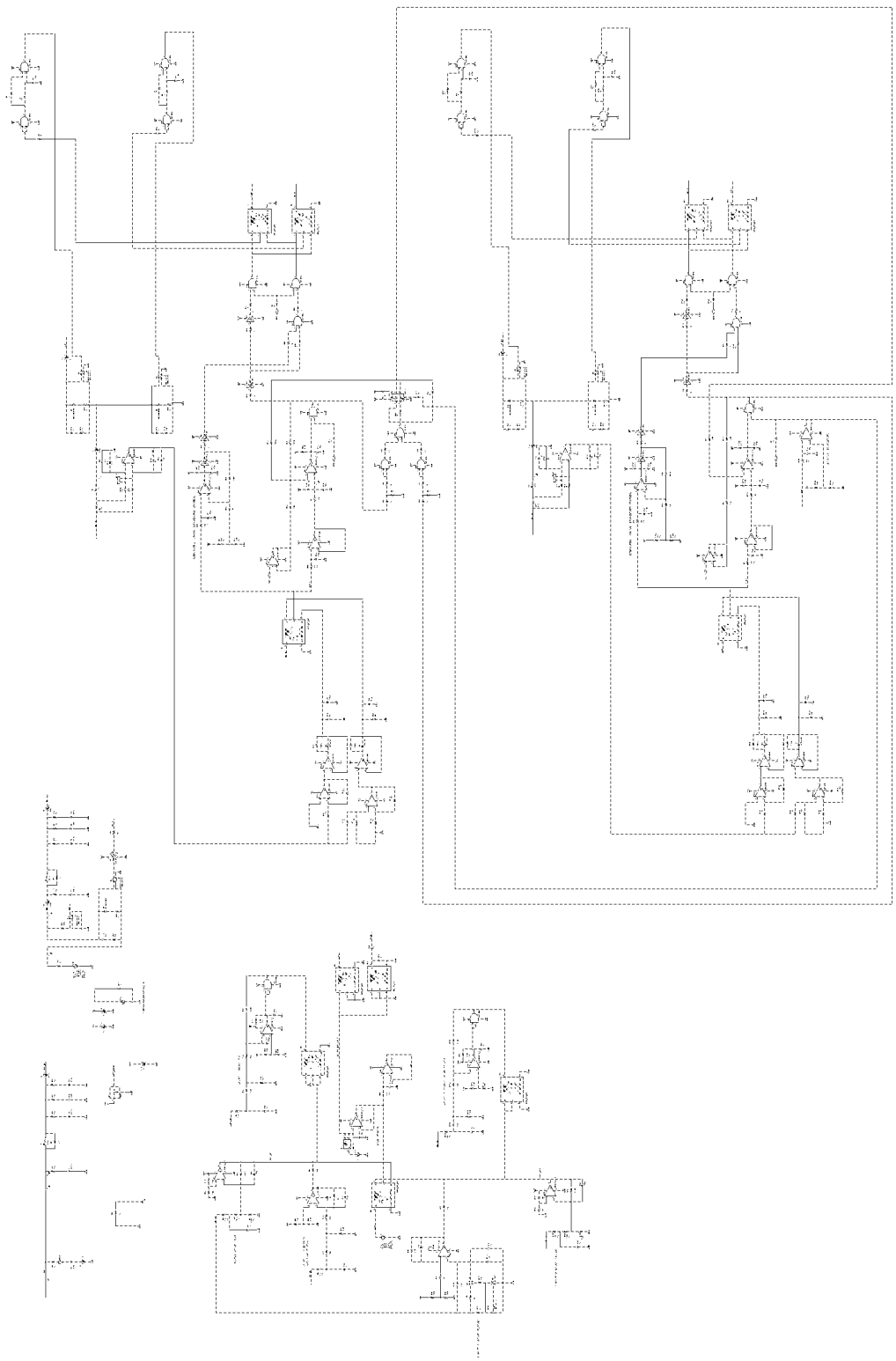
FIG. 37 shows an example of an application of the power supply unit according to the present invention.

FIG. 37 illustrates an exemplary application of the feeding device 3 according to the present invention.

It will be understood that various modifications and/or improvements obvious to those skilled in the art can be made to various applications of the invention described herein without departing from the scope of the invention defined by the appended claims.

For example, the system may include more than two converters and the synchronizing device can synchronize more than two converters.

The invention claimed is:

1. A power supply unit for supplying electrical energy to an on-board network of a vehicle comprising
at least two converters DC/DC interlaced current and reversible between a step-down voltage mode and a step-up voltage mode, said converters being connected to an electrical energy storage device and able to provide a current to the on-board network,
a switch enabling a power source to supply an electrical system when the switch is in a first state, allows the electric energy storage device to power the on-board network when the switch is in a second state,
wherein the converters are variable frequency converters, and the power supply unit further comprises a synchronizing device configured to synchronize the operation of the converters operating at different frequencies and the current generation of the converters,
wherein the synchronizing device comprises
means for receiving a switching signal generated by each of the converters,
means for detecting a transition type of the received switching signal,
means for generating a synchronization signal when a transition is detected and,
means for providing the synchronization signal to one of the converters, said means being configured to provide the synchronization signal to a converter and being different in sequence each time a transition is detected, and,
wherein the means for detecting a transition type of the received switching signal include an OR circuit.

2. A power supply unit for supplying electrical energy to an on-board network of a vehicle comprising
at least two converters DC/DC interlaced current and reversible between a step-down voltage mode and a step-up voltage mode, said converters being connected to an electrical energy storage device and able to provide a current to the on-board network,
a switch enabling a power source to supply an electrical system when the switch is in a first state, allows the electric energy storage device to power the on-board network when the switch is in a second state,
wherein the converters are variable frequency converters, and the power supply unit further comprises a synchronizing device configured to synchronize the operation of the converters operating at different frequencies and the current generation of the converters,
wherein the synchronizing device comprises
means for receiving a switching signal generated by each of the converters,
means for detecting a transition type of the received switching signal,
means for generating a synchronization signal when a transition is detected and,
means for providing the synchronization signal to one of the converters, said means being configured to provide the synchronization signal to a converter and being different in sequence each time a transition is detected, and,
wherein the means for generating a synchronization signal when a transition is detected include a D flip-flop.

3. A system comprising a power supply unit for supplying electrical energy to an on-board network of a vehicle comprising at least two converters DC/DC interlaced current and reversible between a step-down voltage mode and a step-up voltage mode, said converters being connected to an electrical energy storage device and able to provide a current to the on-board network, a switch enabling a power source to supply the electrical system when the switch is in a first state, allows the electric energy storage device to power the on-board network when the switch is in a second state, and wherein the converters are variable frequency converters, and the power supply unit further comprises a synchronizing device configured to synchronize the operation of the converters operating at different frequencies and the current generation of the converters, an electric power source connected to the unit, and an on-board network connected to the unit, the on-board network including a calculator and at least one power consumer device.

\* \* \* \* \*